(12) United States Patent
Smolyanskiy et al.

(10) Patent No.: US 12,072,443 B2
(45) Date of Patent: Aug. 27, 2024

(54) SEGMENTATION OF LIDAR RANGE IMAGES

(71) Applicant: NVIDIA Corporation, Santa Clara, CA (US)

(72) Inventors: Nikolai Smolyanskiy, Seattle, WA (US); Ryan Oldja, Redmond, WA (US); Ke Chen, Sunnyvale, CA (US); Alexander Popov, Kirkland, WA (US); Joachim Pehserl, Lynnwood, WA (US); Ibrahim Eden, Redmond, WA (US); Tilman Wekel, Sunnyvale, CA (US); David Wehr, Redmond, WA (US); Ruchi Bhargava, Redmond, WA (US); David Nister, Bellevue, WA (US)

( * ) Notice: Subject to any disclaimer, the term of this patent is extended or adjusted under 35 U.S.C. 154(b) by 0 days.

(21) Appl. No.: 17/377,053

(22) Filed: Jul. 15, 2021

(65) Prior Publication Data

US 2021/0342608 A1     Nov. 4, 2021

Related U.S. Application Data

(63) Continuation of application No. 16/915,346, filed on Jun. 29, 2020, now Pat. No. 11,532,168, and a
(Continued)

(51) Int. Cl.
*G01S 7/48* (2006.01)
*B60W 60/00* (2020.01)
(Continued)

(52) U.S. Cl.
CPC ....... *G01S 7/4802* (2013.01); *B60W 60/0011* (2020.02); *B60W 60/0016* (2020.02);
(Continued)

(58) Field of Classification Search
CPC .... G06V 20/584; G06V 20/58; G01S 17/931; G01S 17/89; B60W 60/0016;
(Continued)

(56) References Cited

U.S. PATENT DOCUMENTS 9,098,754 B1     8/2015  Stout et al.
9,286,538 B1 *   3/2016  Chen ................ G06T 11/003
(Continued)

FOREIGN PATENT DOCUMENTS

CA       2934636 A1    1/2017
CN    106796718 A      5/2017
(Continued)

OTHER PUBLICATIONS

Non-Final Office Action dated May 17, 2022 in U.S. Appl. No. 16/836,583, 47 pages.
(Continued)

*Primary Examiner* — Peter M Bythrow
*Assistant Examiner* — Nazra Nur Waheed
(74) *Attorney, Agent, or Firm* — Freestone Intellectual Property Law PLLC

(57) ABSTRACT

A deep neural network(s) (DNN) may be used to detect objects from sensor data of a three dimensional (3D) environment. For example, a multi-view perception DNN may include multiple constituent DNNs or stages chained together that sequentially process different views of the 3D environment. An example DNN may include a first stage that performs class segmentation in a first view (e.g., perspective view) and a second stage that performs class segmentation and/or regresses instance geometry in a second view (e.g., top-down). The DNN outputs may be processed to generate 2D and/or 3D bounding boxes and class labels for detected objects in the 3D environment. As such, the techniques described herein may be used to detect and
(Continued)

classify animate objects and/or parts of an environment, and these detections and classifications may be provided to an autonomous vehicle drive stack to enable safe planning and control of the autonomous vehicle.

20 Claims, 20 Drawing Sheets

Related U.S. Application Data continuation of application No. 16/836,583, filed on Mar. 31, 2020, now Pat. No. 11,885,907, and a continuation of application No. 16/836,618, filed on Mar. 31, 2020, now Pat. No. 11,531,088.

(60) Provisional application No. 62/938,852, filed on Nov. 21, 2019, provisional application No. 62/936,080, filed on Nov. 15, 2019.

(51) Int. Cl.
| | |
|---|---|
| *G01S 17/89* | (2020.01) |
| *G01S 17/931* | (2020.01) |
| *G05D 1/00* | (2006.01) |
| *G06N 3/045* | (2023.01) |
| *G06T 19/00* | (2011.01) |
| *G06V 10/25* | (2022.01) |
| *G06V 10/26* | (2022.01) |
| *G06V 10/44* | (2022.01) |
| *G06V 10/764* | (2022.01) |
| *G06V 10/774* | (2022.01) |
| *G06V 10/80* | (2022.01) |
| *G06V 10/82* | (2022.01) |
| *G06V 20/56* | (2022.01) |
| *G06V 20/58* | (2022.01) |
| *G06V 10/10* | (2022.01) |

(52) U.S. Cl.
CPC ......... *B60W 60/0027* (2020.02); *G01S 17/89* (2013.01); *G01S 17/931* (2020.01); *G05D 1/0088* (2013.01); *G06N 3/045* (2023.01); *G06T 19/006* (2013.01); *G06V 10/25* (2022.01); *G06V 10/26* (2022.01); *G06V 10/454* (2022.01); *G06V 10/764* (2022.01); *G06V 10/774* (2022.01); *G06V 10/803* (2022.01); *G06V 10/82* (2022.01); *G06V 20/56* (2022.01); *G06V 20/58* (2022.01); *G06V 20/584* (2022.01); *B60W 2420/403* (2013.01); *G06T 2207/10028* (2013.01); *G06T 2207/20081* (2013.01); *G06T 2207/20084* (2013.01); *G06T 2207/30261* (2013.01); *G06V 10/16* (2022.01)

(58) Field of Classification Search
CPC ......... B60W 60/0027; B60W 60/0011; B60W 2420/403; G05D 1/0088; G06N 3/0454; G06T 19/006; G06T 2207/10028; G06T 2207/20081; G06T 2207/20084; G06T 2207/30261
See application file for complete search history.

(56) References Cited

U.S. PATENT DOCUMENTS

| | | | | |
|---|---|---|---|---|
| 10,593,042 | B1* | 3/2020 | Douillard | G06F 18/24 |
| 10,809,361 | B2* | 10/2020 | Vallespi-Gonzalez | |
| | | | | G01S 13/867 |
| 10,825,188 | B1 | 11/2020 | Tan et al. | |
| 10,860,034 | B1* | 12/2020 | Ziyaee | G06N 3/045 |
| 10,885,698 | B2 | 1/2021 | Muthler et al. | |
| 10,915,793 | B2* | 2/2021 | Corral-Soto | G06F 18/251 |
| 10,970,871 | B2 | 4/2021 | Nezhadarya et al. | |
| 11,062,454 | B1* | 7/2021 | Cohen | G06V 10/82 |
| 11,380,108 | B1 | 7/2022 | Cai et al. | |
| 11,704,572 | B1 | 7/2023 | Pronovost et al. | |
| 2015/0036870 | A1* | 2/2015 | Mundhenk | G06V 20/176 |
| | | | | 382/100 |
| 2016/0073080 | A1* | 3/2016 | Wagner | H04N 13/239 |
| | | | | 348/47 |
| 2017/0023473 | A1 | 1/2017 | Wegner et al. | |
| 2017/0293837 | A1 | 10/2017 | Cosatto et al. | |
| 2017/0307735 | A1 | 10/2017 | Rohani et al. | |
| 2018/0101720 | A1 | 4/2018 | Liu | |
| 2018/0108134 | A1* | 4/2018 | Venable | G06T 7/521 |
| 2018/0173971 | A1 | 6/2018 | Jia et al. | |
| 2018/0211403 | A1 | 7/2018 | Hotson et al. | |
| 2018/0247160 | A1 | 8/2018 | Rohani et al. | |
| 2018/0314253 | A1 | 11/2018 | Mercep et al. | |
| 2018/0349746 | A1 | 12/2018 | Vallespi-Gonzalez | |
| 2019/0026571 | A1 | 1/2019 | Ryan | |
| 2019/0026588 | A1 | 1/2019 | Ryan | |
| 2019/0026597 | A1 | 1/2019 | Zeng et al. | |
| 2019/0145765 | A1 | 5/2019 | Luo et al. | |
| 2019/0147260 | A1 | 5/2019 | May | |
| 2019/0147331 | A1 | 5/2019 | Arditi | |
| 2019/0147610 | A1 | 5/2019 | Frossard et al. | |
| 2019/0258878 | A1 | 8/2019 | Koivisto et al. | |
| 2019/0279366 | A1 | 9/2019 | Sick et al. | |
| 2019/0324148 | A1 | 10/2019 | Kim et al. | |
| 2019/0361454 | A1* | 11/2019 | Zeng | G05D 1/0274 |
| 2020/0013219 | A1 | 1/2020 | Dhua et al. | |
| 2020/0104584 | A1 | 4/2020 | Zheng et al. | |
| 2020/0175326 | A1 | 6/2020 | Shen et al. | |
| 2020/0193606 | A1 | 6/2020 | Douillard et al. | |
| 2020/0301013 | A1 | 9/2020 | Banerjee et al. | |
| 2021/0082181 | A1 | 3/2021 | Shi et al. | |
| 2021/0109523 | A1* | 4/2021 | Zou | G01S 13/862 |
| 2021/0146952 | A1 | 5/2021 | Vora et al. | |
| 2021/0149051 | A1 | 5/2021 | Ding et al. | |
| 2021/0166426 | A1 | 6/2021 | McCormac et al. | |
| 2021/0181758 | A1 | 6/2021 | Das et al. | |
| 2022/0327743 | A1 | 10/2022 | Oh et al. | |

FOREIGN PATENT DOCUMENTS

| | | |
|---|---|---|
| CN | 108171217 A | 6/2018 |
| CN | 108334081 A | 7/2018 |
| CN | 108596058 A | 9/2018 |
| CN | 109284764 A | 1/2019 |
| CN | 109291929 A | 2/2019 |
| CN | 109814130 A | 5/2019 |
| CN | 110032949 A | 7/2019 |
| CN | 110366710 A | 10/2019 |
| EP | 3 525 000 A1 | 8/2019 |
| WO | 2019178548 A1 | 9/2019 |

OTHER PUBLICATIONS

Notice of Allowance dated Jul. 7, 2022 in U.S. Appl. No. 16/915,346, 8 pages.
Notice of Allowance dated Aug. 3, 2022 in U.S. Appl. No. 16/836,618, 8 pages.
Taxonomy and Definitions for Terms Related to Driving Automation Systems for On-Road Motor Vehicles, Society of Automotive Engineers (SAE), Standard No. J3016-201609, pp. 1-30 (Sep. 30, 2016).
Taxonomy and Definitions for Terms Related to Driving Automation Systems for On-Road Motor Vehicles, Society of Automotive Engineers (SAE), Standard No. J3016-201806, pp. 1-35 (Jun. 15, 2018).
Chen, X., et al., "Multi-View 3D Object Detection Network for Autonomous Driving", Cornell University Library, pp. 1-9 (Nov. 23, 2016).

(56) References Cited

OTHER PUBLICATIONS

Furukawa, H., "Deep learning for end-to-end automatic target recognition from synthetic aperture radar imagery", IEICE, pp. 35-40 (2018).
Geus, D. D., et al., "Single Network Panoptic Segmentation for Street Scene Understanding", IEEE Intelligent Vehicles Symposium (IV), pp. 709-715 (Jun. 2019).
He, K., et al., "Deep residual learning for image recognition", In Proceedings of the IEEE conference on computer vision and pattern recognition, pp. 770-778 (2016).
Krizhevsky, A., et al., "Imagenet classification with deep convolutional neural networks", In Advances in neural information processing systems, pp. 1-9 (2012).
Kendall, A., et al., "What uncertainties do we need in bayesian deep learning for computer vision?", In Advances in neural information processing systems, pp. 1-11 (2017).
Kendall, A., et al., "Multi-task learning using uncertainty to weigh losses for scene geometry and semantics", In Proceedings of the IEEE conference on computer vision and pattern recognition, pp. 7482-7491 (2018).
Ku, J., et al., "Joint 3D Proposal Generation and Object Detection from View Aggregation", IEEE/RSJ International Conference on Intelligent Robots and Systems, pp. 5750-5757 (Oct. 2018).
Kirillov, A., et al., "Panoptic segmentation", In Proceedings of the IEEE conference on computer vision and pattern recognition, pp. 1-10 (2019).
Luo, W., et al., "Fast and furious: Real time end-to-end 3d detection, tracking and motion Forecasting with a single convolutional net", In Proceedings of the IEEE conference on Computer Vision and Pattern Recognition, pp. 3569-3577 (2018).
Liu, H., et al., "An End-To-End Network for Panoptic Segmentation", IEEE/CVF Conference on Computer Vision and Pattern Recognition (CVPR), pp. 6165-6174 (2019).
Nezhadarya, E., et al., "BoxNet: A Deep Learning Method for 2D Bounding Box Estimation from Bird's-Eye View Point Cloud", IEEE Intelligent Vehicles Symposium (IV), pp. 1557-1564 (Jun. 2019).
Qi, C. R., et al., "Pointnet: Deep learning on point sets for 3d classification and segmentation", In Proceedings of the IEEE conference on computer vision and pattern recognition, pp. 652-660 (2017).
Ronneberger, O., et al., "U-net: Convolutional networks for biomedical image segmentation", In International Conference on Medical image computing and computer-assisted intervention, pp. 1-8 (2015).
Szegedy, C., et al., "Going deeper with convolutions", In Proceedings of the IEEE conference on computer vision and pattern recognition, pp. 1-9 (2015).
Kiong, Y., et al., "UPSNet: A Unified Panoptic Segmentation Network", IEEE/CVF Conference on Computer Vision and Pattern Recognition, pp. 8810-8818 (2019).
Zhang, W., et al., "LiSeg: Lightweight Road-object Semantic Segmentation In 3D LiDAR Scans For Autonomous Driving", IEEE Intelligent Vehicles Symposium(IV), pp. 1021-1026 (Jun. 2018).
Zhou, Y., et al., "End-to-End Multi-View Fusion for 3D Object Detection in LiDAR Point Clouds", Cornell University Library, pp. 1-10 (Oct. 2019).
Extended European Search Report and Opinion received for European Patent Application No. 20206733.6, dated Jul. 20, 2021, 12 pages.
Non-Final Office Action dated Aug. 19, 2021 in U.S. Appl. No. 16/915,346, 17 pages.
ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Search Report and Written Opinion received for PCT Patent Application No. PCT/US2020/043611, dated Nov. 4, 2020, 10 pages.
Partial European Search Report and Opinion received for European Patent Application No. 20206733.6, dated Apr. 13, 2021, 16 pages.
Extended European Search Report and Opinion received for European Patent Application No. 20204403.8, dated May 6, 2021, 13 pages.
Extended European Search Report and Opinion received for European Patent Application No. 20205868.1, dated May 10, 2021, 14 pages.
International Preliminary Report on Patentability received for PCT Application No. PCT/US2020/043611, dated Feb. 3, 2022, 9 pages.
Non-Final Office Action dated Feb. 11, 2022 in U.S. Appl. No. 16/915,346, 24 pages.
Preinterview First Office Action dated Apr. 25, 2022 in U.S. Appl. No. 16/836,618, 4 pages.
Final Office Action dated Sep. 21, 2022 in U.S. Appl. No. 16/836,583, 56 pages.
Non-Final Office Action dated Oct. 17, 2022 in U.S. Appl. No. 16/938,706, 33 pages.
Non-Final Office Action dated Mar. 21, 2023 in U.S. Appl. No. 16/836,583, 53 pages.
Final Office Action dated Apr. 10, 2023 in U.S. Appl. No. 16/938,706, 12 pages.
Non-Final Office Action dated Mar. 31, 2023 in U.S. Appl. No. 17/895,940, 14 pages.
Non-Final Office Action dated May 5, 2023 in U.S. Appl. No. 17/377,064, 9 pages.
Final Office Action dated Jun. 2, 2023 in U.S. Appl. No. 16/836,583, 31 pages.
Non-Final Office Action dated Jun. 23, 2023 in U.S. Appl. No. 16/938,706, 11 pages.
Erhan, D., et al., "Scalable Object Detection using Deep Neural Networks", In Proceedings of the IEEE Conference on Computer Vision and Pattern Recognition (CVPR), IEEE, pp. 8 (2014).
Notice of Allowance dated Jul. 6, 2023 in U.S. Appl. No. 17/895,940, 8 pages.
Office Action received for European Patent Application No. 20206733.6, dated May 22, 2023, 4 pages.
Final Office Action dated Oct. 17, 2023 in U.S. Appl. No. 17/377,064, 10 pages.
Non-Final Office Action dated Nov. 7, 2023 in U.S. Appl. No. 17/976,581, 8 pages.
Notice of Allowance dated Sep. 20, 2023 in U.S. Appl. No. 16/836,583, 13 pages.
Notice of Allowance dated Oct. 4, 2023 in U.S. Appl. No. 16/938,706, 8 pages.
Non-Final office action received for U.S. Appl. No. 17/377,064, mailed on Jan. 31, 2024, 9 pages.
Notice of Allowance dated Dec. 20, 2023 in U.S. Appl. No. 17/976,581, 8 pages.
Office Action received for Chinese Patent Application No. 202011272919.8, mailed on Dec. 29, 2023, 24 pages (12 pages of English Translation and 12 pages of Office Action).
European Office Action dated Nov. 23, 2023 in Application No. 20205868.1, 9 pages.
Jayakrishnan Unnikrishan, et al. "Resolving Elevation Ambiguity in 1-D Radar Array Measurements Using Deep Learning", International Conference on Intelligent Robots and Systems, Macau, China, Nov. 4-8, 2019, 6 pages.
Notice of Allowance received for U.S. Appl. No. 17/895,940, mailed on Mar. 20, 2024, 9 pages.
Object Detection and Classification by Decision-Level Fusion for Intelligent Vehicle Systems. Oh et al. (Year: 2016).
Office Action received for Chinese Patent Application No. 202011294650.3, mailed on Mar. 1, 2024, 24 pages (14 pages of Original OA and 10 pages of English Translation).
Office action received for Chinese Patent Application No. 202011297922.5, mailed on Mar. 16, 2024, 7 pages (2 pages English Translation and 5 pages of Original Copy).
Final Office Action, U.S. Appl. No. 17/377,064, Notification Date: Jun. 5, 2024, 10 pages.

(56) References Cited

OTHER PUBLICATIONS

Notice of Allowance, U.S. Appl. No. 17/976,581, Notification Date: May 31, 2024, 7 pages.
Notice of Allowance, U.S. Appl. No. 16/938,706, Notification Date: Jun. 12, 2024, 8 pages.

\* cited by examiner

PRIOR ART

PRIOR ART

SEGMENTATION OF LIDAR RANGE IMAGES

CROSS-REFERENCE TO RELATED APPLICATIONS

This application is a continuation of U.S. Non-Provisional application Ser. No. 16/915,346, filed on Jun. 29, 2020, U.S. Non-Provisional application Ser. No. 16/836,618, filed Mar. 31, 2020, and U.S. Non-Provisional application Ser. No. 16/836,583, filed on Mar. 31, 2020, each of which claims priority to No. 62/938,852, filed on Nov. 21, 2019. Application Ser. No. 16/915,346 also claims priority to U.S. Provisional Application No. 62/936,080, filed on Nov. 15, 2019. The contents of each of the foregoing applications are hereby incorporated by reference in their entirety.

BACKGROUND

Designing a system to safely drive a vehicle autonomously without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along the path of the vehicle. Thus, the ability to detect instances of animate objects (e.g., cars, pedestrians, etc.) and other parts of an environment is often critical for autonomous driving perception systems. Conventional perception methods often rely on cameras or LiDAR sensors to detect objects in an environment, and a variety of approaches have been developed using Deep Neural Networks (DNNs) to perform LiDAR and camera perception. Classes of such DNNs include DNNs that perform panoptic segmentation of camera images in perspective view, and DNNs that perform top-down or "Bird's Eye View" (BEV) object detection from LiDAR point clouds. However, these conventional approaches have a number of drawbacks.

For example, conventional panoptic segmentation DNNs generally perform class and instance segmentation of images in perspective view (e.g., RBG images from front-facing cameras or LiDAR range scans). FIG. 1 is an illustration of example LiDAR range scans with a perspective view and segmented classes from panoptic segmentations of the LiDAR range scans. In FIG. 1, each LiDAR input (range scan) is shown with a corresponding classification mask showing an example segmentation output (segmented classes). For simplicity, segmented instances have been omitted from FIG. 1. FIG. 2 is an illustration of an example panoptic segmentation of a camera image with a perspective view. In FIG. 2, the top image is the input image to be segmented, the middle image is a classification mask showing segmented classes superimposed on the input image, and the lower image is an instance mask showing segmented instances superimposed on the input image.

Due to the characteristic geometry (e.g., consistent structures) of objects in certain classes, panoptic segmentation in perspective view often performs well for certain classes like pedestrians and bicyclists. However, panoptic segmentation is often challenged when evaluating features that are not visible from the perspective of the view being analyzed. For example, while panoptic segmentation may be able to detect a pedestrian in a front-facing image, panoptic segmentation DNNs often struggle to accurately predict 3D bounding boxes or BEV two-dimensional (2D) bounding boxes for detected objects. Similarly, panoptic segmentation DNNs that use a perspective view often struggle to accurately detect objects with distinguishing features that are not visible from the perspective of the view being analyzed. As such, conventional panoptic segmentation DNNs have a limited accuracy in predicting object classification, object instances, dimensions, and orientation.

Conventional DNNs that perform object detection from BEV (top-down) projections of LiDAR point clouds often detect a single class, including cars, trucks, buses, pedestrians, and/or cyclists, in predicting BEV 2D bounding boxes. FIG. 3 is an illustration of an example object detection performed on a top-down projection of a LiDAR point cloud. DNNs that perform BEV object detection often struggle to accurately detect pedestrians or bicycles, since top-down views of these objects often appear similar to top-down views of other objects like poles, tree trunks, or bushes. As such, conventional DNNs that perform BEV object detection have a limited accuracy in predicting object classification, dimensions, and orientation. A potential solution to this problem is to use 3D convolutions over a 3D voxelized volume. However, 3D convolutions are very computationally expensive and would need to process a significant amount of empty voxel space in the searched volume, thereby leading to substantial inefficiencies.

SUMMARY

Embodiments of the present disclosure relate to LiDAR perception for autonomous machines using deep neural networks (DNNs). For example, systems and methods described herein use object detection techniques to identify or detect instances of obstacles (e.g., cars, trucks, pedestrians, cyclists, etc.) and other objects such as environmental parts for use by autonomous vehicles, semi-autonomous vehicles, robots, and/or other object types. In contrast to conventional systems, such as those described above, the system of the present disclosure may include multiple constituent DNNs or stages chained together that sequentially process different views of the 3D environment. An example multi-view perception DNN may include a first stage that performs class segmentation in a first view (e.g., perspective view) and a second stage that performs class segmentation and/or regresses instance geometry in a second view (e.g., top-down).

For example, the first stage may extract classification data (e.g., confidence maps, segmentations masks, etc.) from a LiDAR range image or an RGB image. The extracted classification data may be transformed to a second view of the environment, for example, by labeling corresponding 3D locations (e.g., identified by corresponding pixels of a LiDAR range image) with the extracted classification data, and projecting the labeled 3D locations to the second view. In some embodiments, geometry data (e.g., height data) of objects in the 3D space may be obtained from sensor data (e.g., by projecting a LiDAR point cloud into one or more height maps in a top-down view) and/or images of the 3D space (e.g., by unprojecting an image into world space and projecting into a top-down view). The extracted classification data and/or geometry data may be stacked and fed into a second stage of the DNN, which may extract classification data (e.g., class confidence maps) and/or regress various types of information about the detected objects, such as location, geometry, and/or orientation in the second view. The DNN outputs may be processed to generate 2D and/or 3D bounding boxes and class labels for detected objects in the 3D environment.

As such, the techniques described herein may be used to detect and classify animate objects and/or parts of an environment, and these detections and classifications may be provided to an autonomous vehicle drive stack to enable safe planning and control of the autonomous vehicle. Unlike conventional approaches, by sequentially processing multiple views of sensor data with a multi-view perception DNN, the present techniques may retain the advantages of separately processing each view, while mitigating potential drawbacks. Using the approaches described herein, motorcycles, bikes, pedestrians and other vulnerable road users (VRUs) or objects may be detected with a high recall rate. Further, embodiments of the present disclosure may provide a simple and effective way to detect and classify objects, and regress their dimensions and orientations, where conventional methods struggle.

BRIEF DESCRIPTION OF THE DRAWINGS

The present systems and methods for multi-view LiDAR perception are described in detail below with reference to the attached drawing figures, wherein.

DETAILED DESCRIPTION

Figure 1:
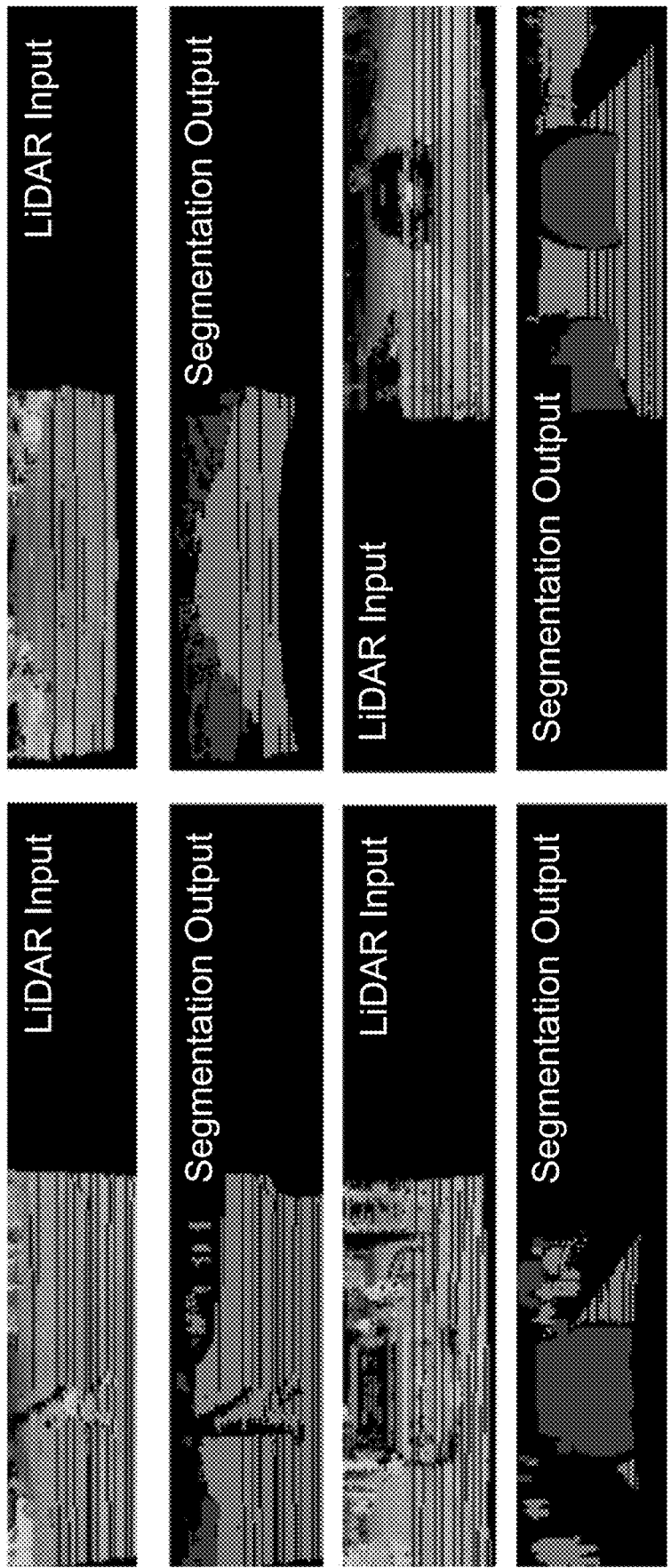
FIG. 1 is an illustration of example LiDAR range scans with a perspective view and segmented classes from panoptic segmentations of the LiDAR range scans.
Figure 2:
FIG. 2 is an illustration of an example panoptic segmentation of a camera image with a perspective view.
Figure 3:
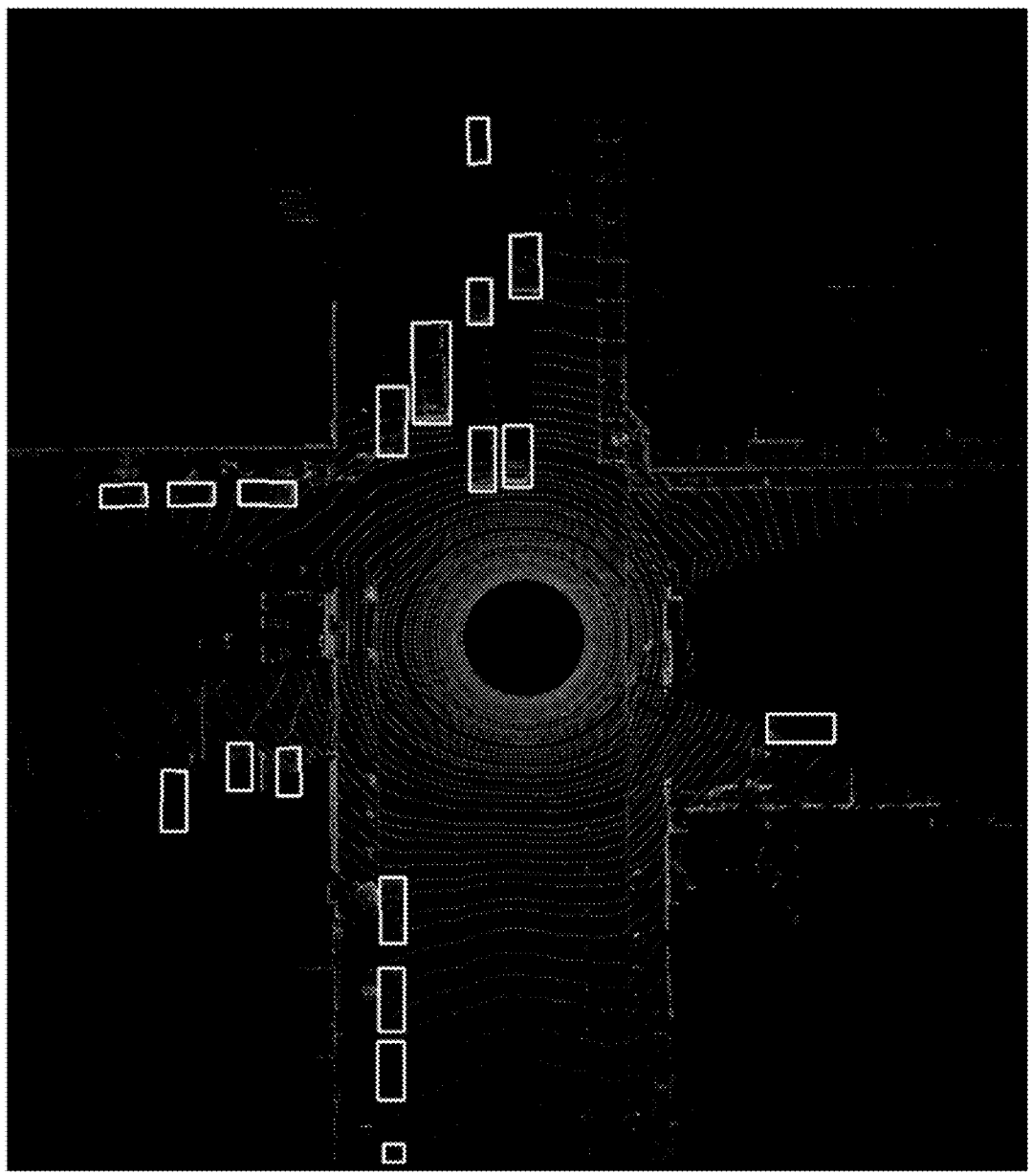
FIG. 3 is an illustration of an example object detection performed on a top-down projection of a LiDAR point cloud.

Systems and methods are disclosed relating to multi-view LiDAR perception for autonomous machines using deep neural networks (DNNs). For example, systems and methods described herein use object detection techniques to identify or detect instances of obstacles (e.g., cars, trucks, pedestrians, cyclists, etc.) and other objects such as environmental parts for use by autonomous vehicles, semi-autonomous vehicles, robots, and/or other object types.

Although the present disclosure may be described with respect to an example autonomous vehicle 1600 (alternatively referred to herein as "vehicle 1600" or "ego-vehicle 1600," an example of which is described herein with respect to FIGS. 16A-16D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), boating systems (e.g., path planning for a boat or other water vessel), and/or other technology areas, such as for localization, path planning, and/or other processes.

At a high level, a DNN may be used to detect objects from LiDAR data and/or other sensor data that captures a three dimensional (3D) environment. In some embodiments, the DNN may include multiple constituent DNNs or stages chained together that sequentially process different views of the 3D environment. An example multi-view perception DNN may include a first stage that performs class segmentation in a first view (e.g., perspective view) and a second stage that performs class segmentation and/or regresses instance geometry in a second view (e.g., top-down).

In some embodiments, the input to the DNN may be formed from LiDAR data (e.g., a LiDAR range image, a projection of a LiDAR point cloud, etc.) and/or data from other sensors (e.g., images from any number of cameras), and the first stage may extract classification data (e.g., class confidence data such as confidence maps for any number of classes) from the input. The confidence maps and/or a composite segmentation mask may segment (and therefore represent) a first view (e.g., perspective view) of the 3D space. The confidence maps and/or composite segmentation may be projected into a second view (e.g., top-down) to generate transformed classification data for processing by a subsequent DNN stage. For example, the extracted classification data may be used to label corresponding 3D locations (e.g., identified by the LiDAR range image), and the labeled 3D locations (e.g., the labeled LiDAR range image) may be re-projected to a second view of the environment.

In some embodiments, geometry data (e.g., height data) of objects in the 3D space may be obtained from LiDAR data (e.g., by projecting a LiDAR point cloud into one or more height maps in a top-down view) and/or images of the 3D space (e.g., by unprojecting an image into world space and projecting into a top-down view). The transformed classification data and geometry data may be stacked and fed into a second stage of the DNN, which may extract classification data (e.g., class confidence data such as confidence maps for any number of classes) and/or regress various types of information about the detected objects, such as location, geometry, and/or orientation. The DNN outputs may be processed to generate 2D and/or 3D bounding boxes and class labels for detected objects in the 3D environment.

Generally, the multi-view perception DNN may accept as an input some representation of LiDAR data and/or other sensor data of a 3D environment. In some embodiments, to form the input into the DNN, raw LiDAR detections from an environment around an ego-object—such as a moving vehicle—may be pre-processed into a format that the DNN understands. In particular, LiDAR data (e.g., raw LiDAR detections from an ordered or unordered LiDAR point cloud) may be accumulated, transformed to a single coordinate system (e.g., centered around the ego-actor), ego-motion-compensated (e.g., to a latest known position of the ego-actor), and/or projected to form a LiDAR range image.

In some situations, forming a range scan image such as a LiDAR range image may result in some sensor data being lost. For example, it may be possible for reflections from multiple objects in a scene to be binned together into one range scan pixel when accumulating detections over time while the ego-object is moving, when accumulating detections from different sensors mounted at different locations of the ego-object (i.e., capturing sensor data from different views of the scene), and/or when collapsing sensor data into a range image with a resolution that is insufficient to represent adjacent sensor data. In some embodiments, when reflections are binned together in a pixel of a range image, the reflection with the closest range may be represented in the range image and the other reflections may be dropped. Additionally or alternatively, the resolution of the range image may be selected in such a way as to reduce the loss of sensor data and/or limit the loss of accuracy. For example, the height (or vertical resolution) of the range image may be set to correspond with the number of horizontal scan lines of the sensor capturing the sensor data (e.g., one row of pixels in the range image per scan line of a corresponding LiDAR sensor). The width (or horizontal resolution) of the range image may be set based on the horizontal resolution of the sensor capturing the sensor data. Generally, horizontal resolution may be a design choice: a lower resolution may have fewer collisions, but may be easier to process (and vice versa).

In some embodiments, the LiDAR range image may be fed into the multi-view perception DNN (e.g., a first stage of the DNN). Additionally or alternatively, the LiDAR range image and/or other sensor data may be stacked into corresponding channels of an input tensor and fed into the multi-view perception DNN. In any event, the DNN may include multiple stages chained together that sequentially process the data from multiple views to predict classification data and/or object instance data for detected objects in a 3D environment. These outputs may be processed into 2D and/or 3D bounding boxes and class labels for the detected objects. In an example application for autonomous vehicles, the DNN may be used to predict one or more bounding boxes (e.g., 2D bounding box in top-down view, 3D bounding box) for each detected object on the road or sidewalk, a class label for each detected object, and a 2D mask demarcating a drivable space, sidewalks, buildings, trees, poles, other static environmental parts (e.g., in the top-down view). In some embodiments, 2D bounding boxes in top-down view may be adapted into 3D bounding boxes by deriving box height from the predicted object instance data.

In embodiments in which the multi-view perception DNN includes a chain of multiple stages, the different stages may be trained together or separately. In some embodiments, the stages may be trained together by implementing a transformation from the output of the first stage (the first view) to the input to the second stage (the second view) using a differentiable operation (e.g., a differentiable re-projection). Training data may be obtained by annotating data from a plurality of sensors in a sensor setup. Since data may be obtained from different sensors at different frequencies, in some embodiments, a particular sensor (e.g., a LiDAR sensor) may be used as a reference sensor. For each frame of sensor data from the reference sensor (e.g., for each frame of LiDAR data), a set of sensor data may be curated by identifying a frame of sensor data from each of the other sensors in the sensor setup that is closest in time to the frame of sensor data from the reference sensor. This set of sensor data (e.g., a frame of LiDAR data at timestamp T plus an image taken closest in time to T from each of a plurality of cameras in the sensor setup) may be referred to as a set of curated sensor data at timestamp T. For each set of curated sensor data, data from each sensor may be labeled independently of data from the other sensors. In some embodiments, object detection and tracking may be applied to track the movement of annotated objects from frame to frame over time. As such, annotation tracking may be used to track objects from frame to frame (e.g., using persistent identifiers for annotated objects). In some embodiments, object tracks and/or detections from sensor data from a particular sensor may be linked to corresponding object tracks and/or detections for the same object from sensor data from a different sensor. Annotations and/or links between different types of sensor data for the same object may be generated manually and/or automatically, and may be used to generate training data for the multi-view perception DNN.

As such, the techniques described herein may be used to detect and classify animate objects and/or parts of an environment, and these detections and classifications may be provided to an autonomous vehicle drive stack to enable safe planning and control of the autonomous vehicle. Unlike conventional approaches, by sequentially processing multiple views of sensor data with a multi-view perception DNN, the present techniques may retain the advantages of separately processing each view, while mitigating potential drawbacks. Using the approaches described herein, motorcycles, bikes, pedestrians and other vulnerable road users (VRU) objects may be detected with a high recall rate. Further, embodiments of the present disclosure may provide a simple and effective way to detect and classify objects, and regress their dimensions and orientations, where conventional methods struggle.

Example Object Detection System

Figure 4:
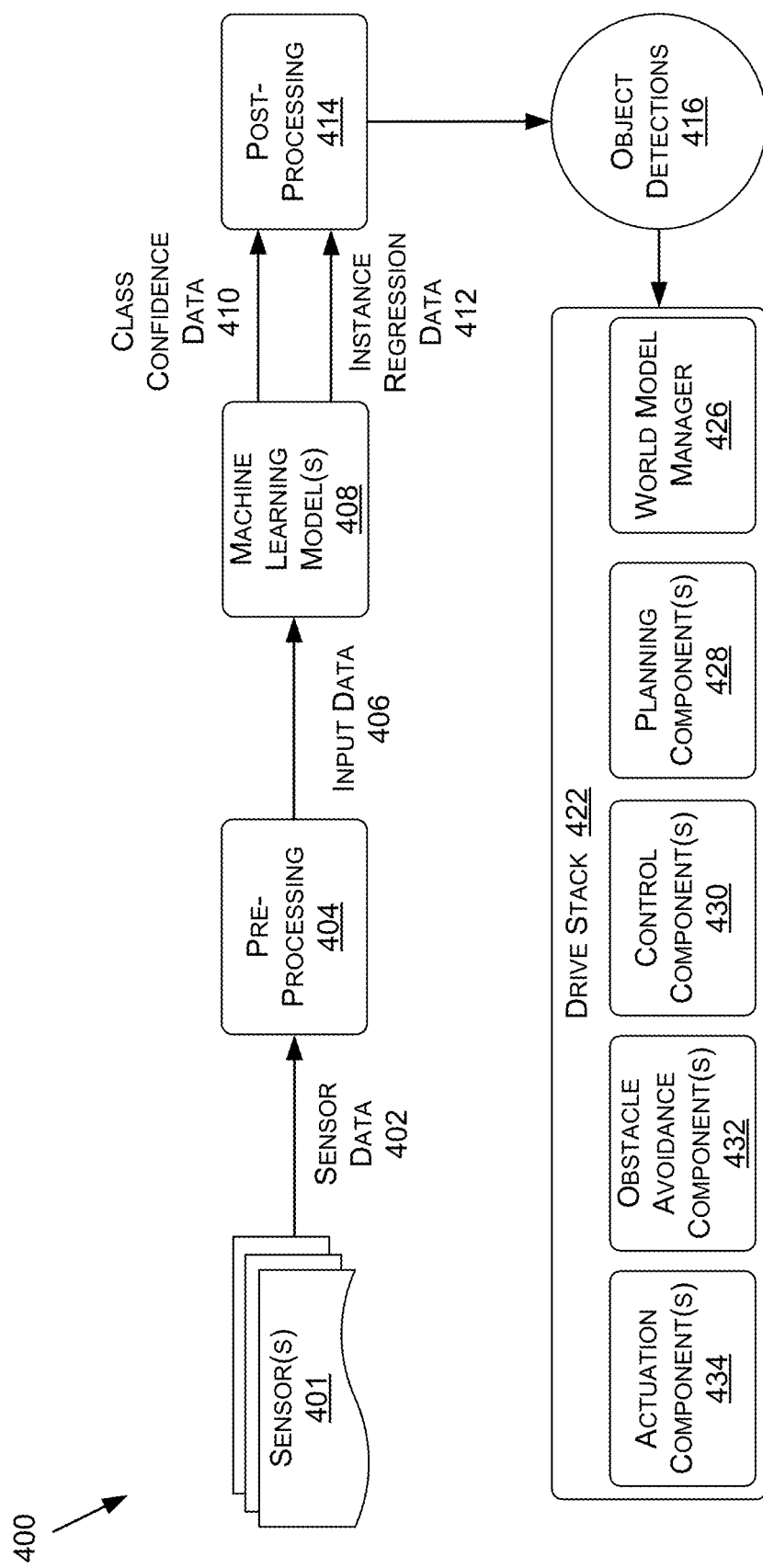
FIG. 4 is a data flow diagram illustrating an example process for an object detection system, in accordance with some embodiments of the present disclosure.

With reference to FIG. 4, FIG. 4 is a data flow diagram illustrating an example process for an object detection system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the process 400 may include a machine learning model(s) 408 configured to detect objects, such as instances of animate objects and/or parts of an environment, based on sensor data 402 of a three dimensional (3D) environment. The sensor data 402 may be pre-processed 404 into input data 406 with a format that the machine learning model(s) 408 understands, and the input data 406 may be fed into the machine learning model(s) 408 to detect objects 416 in the 3D environment. In some embodiments, the machine learning model(s) 408 may include multiple constituent machine learning models or stages chained together that sequentially process different views of the 3D environment. The machine learning model(s) 408 may predict a representation of class confidence for detected objects (e.g., class confidence data 410) and/or a representation of object instance data for detected objects (e.g., instance regression data 412), which may be post-processed 414 into the object detections 416 comprising bounding boxes, closed polylines, or other bounding shapes identifying the locations, sizes, and/or orientations of the detected objects. The object detections 416 may correspond to obstacles around an autonomous vehicle, static environmental parts, and/or other objects, and may be used by control component(s) of the autonomous vehicle (e.g., controller(s) 1636, ADAS system 1638, SOC(s) 1604, software stack 422, and/or other components of the autonomous vehicle 1600 of FIGS. 16A-16D) to aid the autonomous vehicle in performing one or more operations (e.g., obstacle avoidance, path planning, mapping, etc.) within an environment.

Generally, object detection may be performed using sensor data 402 from any number and any type of sensor, such as, without limitation, LiDAR sensors, RADAR sensors, cameras, and/or other sensor types such as those described below with respect to the autonomous vehicle 1600 of FIGS. 16A-16D. For example, the sensors 401 may include one or more sensor(s) 401 of an ego-object or ego-actor—such as LiDAR sensor(s) 1664 of the autonomous vehicle 1600 of FIGS. 16A-16D—and the sensors 401 may be used to generate sensor data 402 representing objects in the 3D environment around the ego-object.

Taking LiDAR data as an example, object detection may be performed using LiDAR data (e.g., sensor data 402) from one or more LiDAR sensors (e.g., sensors 401). Generally, a LiDAR system may include a transmitter that emits pulses of laser light. The emitted light waves reflect off of certain objects and materials, and one of the LiDAR sensors may detect these reflections and reflection characteristics such as bearing, azimuth, elevation, range (e.g., time of beam flight), intensity, reflectivity, signal-to-noise ratio (SNR), and/or the like. Reflections and reflection characteristics may depend on the objects in the environment, speeds, materials, sensor mounting position and orientation, etc. Firmware associated with the LiDAR sensor(s) may be used to control LiDAR sensor(s) to capture and/or process sensor data 402, such as reflection data from the sensor's field of view.

Generally, the sensor data 402 may include raw sensor data, LiDAR point cloud data, and/or reflection data processed into some other format. For example, reflection data may be combined with position and orientation data (e.g., from GNSS and IMU sensors) to form a point cloud representing detected reflections from the environment. Each detection in the point cloud may include a three dimensional location of the detection and metadata about the detection such as one or more of the reflection characteristics. Some nonlimiting examples of LiDAR sensors include Velodyne HDL/VLS Series and Ouster OS1/OS2 Series LiDAR sensors, and a nonlimiting example operating (e.g., scan) frequency may be >=5 Hz. Although these embodiments describe the sensor data 402 as LiDAR data, the sensor data 402 may additionally or alternatively include sensor data from other sensors, such as RADAR data (e.g., RADAR point clouds), image data (e.g., RBG images from one or more cameras mounted around an ego-actor), and/or other types.

The sensor data 402 may be pre-processed 404 into a format that the machine learning model(s) 408 understands. For example, in embodiments where the sensor data 402 includes LiDAR data (and/or other data such as RADAR data), the LiDAR data (and/or other data) may be accumulated, transformed to a single coordinate system (e.g., centered around the ego-actor/vehicle), ego-motion-compensated (e.g., to a latest known position of the ego-actor/vehicle), and/or projected to form a projection image of a desired size (e.g., spatial dimension). For example, an (accumulated, ego-motion-compensated) LiDAR point cloud may be projected form a LiDAR range image with a perspective view. Any suitable perspective projection may be used (e.g., spherical, cylindrical, pinhole, etc.). In some cases, the type of projection may depend on the type of sensor. By way of nonlimiting example, for spinning sensors, a spherical or cylindrical projection may be used. In some embodiments, for a time-of-flight camera (e.g., Flash-LiDAR), a pinhole projection may be used. In another example, an (accumulated, ego-motion-compensated) RADAR point cloud may be orthographically projected to form an overhead image with a desired ground sampling distance. In any event, the projection image (e.g., the LiDAR range image) and/or other reflection data may be stored and/or encoded into a suitable representation (e.g., the input data 406), which may serve as the input into the machine learning model(s) 408.

Figure 5:
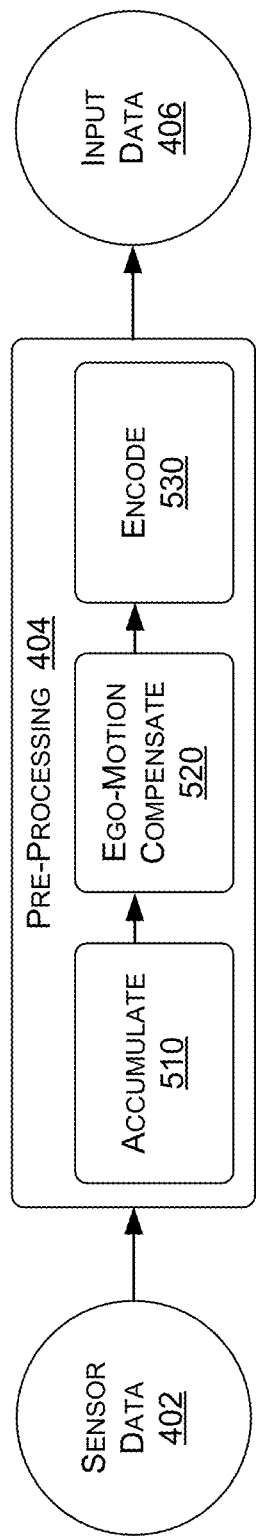
FIG. 5 is a data flow diagram illustrating an example process for pre-processing sensor data for machine learning model(s) in an object detection system, in accordance with some embodiments of the present disclosure.

FIG. 5 is a data flow diagram illustrating an example process for pre-processing 404 the sensor data 402 for a machine learning model(s) 408 in an object detection system, in accordance with some embodiments of the present disclosure. The sensor data 402 may be accumulated 510 (which may include transforming to a single coordinate system), ego-motion-compensated 520, and/or encoded 530 into a suitable representation such as a projection image (e.g., a LiDAR range image) and/or a tensor, for example, with multiple channels storing different reflection characteristics.

More specifically, the sensor data 402 such as LiDAR data may be accumulated 510 from multiple sensors, such as some or all of a plurality of surrounding LiDAR sensor(s) 1664 from different locations of the autonomous vehicle 1600, and may be transformed to a single vehicle coordinate system (e.g., centered around the vehicle). Additionally or alternatively, the sensor data 402 may be accumulated 510 over time in order to increase the density of the accumulated sensor data. Sensor detections may be accumulated over any desired window of time (e.g., 0.5 seconds (s), 1 s, 2 s, etc.). The size of the window may be selected based on the sensor and/or application (e.g., smaller windows may be selected for noisy applications such as highway scenarios). As such, each input into the machine learning model(s) 408 may be generated from accumulated detections from each window of time from a rolling window (e.g., from a duration spanning from t-window size to present). Each window to evaluate may be incremented by any suitable step size, which may but need not correspond to the window size. Thus, each successive input into the machine learning model(s) 408 may be based on successive windows, which may but need not be overlapping.

In some embodiments, ego-motion-compensation 520 may be applied to the sensor data 402. For example, accumulated detections may be ego-motion-compensated to the latest known vehicle position. More specifically, locations of older detections may be propagated to a latest known position of the moving vehicle, using the known motion of the vehicle to estimate where the older detections will be located (e.g., relative to the present location of the vehicle) at a desired point in time (e.g., the current point in time). The result may be a set of accumulated, ego-motion compensated sensor data 402 (e.g., a LiDAR point cloud) for a particular time slice.

In some embodiments, the (accumulated, ego-motion compensated) sensor data 402 may be encoded 530 into a suitable representation such as a projection image, which may include multiple channels storing different features such as reflection characteristics. More specifically, accumulated, ego-motion compensated detections may be projected to form a projection image of a desired size (e.g., spatial dimension). Any desired view of the environment may be selected for the projection image, such as a top down view, a front view, a perspective view, and/or others. In one example, a LIDAR point cloud may be projected (e.g., spherical, cylindrical, pinhole) to form a LiDAR range image with a perspective view of the environment, and the LiDAR range image may be used as the input data 406 to the machine learning model(s) 408. In some embodiments, images with the same or different views may be generated, with each image being input into a separate channel of the machine learning model(s) 408. By way of nonlimiting example, different sensors 401 (whether the same type or a different of sensor) may be used to generate image data (e.g., LiDAR range image, camera images, etc.) having the same (e.g., perspective) view of the environment in a common image space, and image data from different sensors 401 or sensor modalities may be stored in separate channels of a tensor. These are meant simply as examples, and other variations may be implemented within the scope of the present disclosure.

Since image data may be evaluated as an input to the machine learning model(s) 408, there may be a tradeoff between prediction accuracy and computational demand. As such, a desired spatial dimension for a projection image may be selected as a design choice. Additionally or alternatively, to reduce the loss of data resulting from lower image resolutions, a dimension of a projection image may be based on a characteristic of a corresponding sensor 401 that captured the sensor data 402. By way of nonlimiting example, the height (or vertical resolution) of a LiDAR range image may be set to correspond with the number of horizontal scan lines of the sensor capturing the sensor data 402 (e.g., one row of pixels in the range image per scan line of a corresponding LiDAR sensor), and the width (or horizontal resolution) of a LiDAR range image may be set based on the horizontal resolution of the sensor 401 capturing the sensor data 402.

In some embodiments, a projection image may include multiple layers, with pixel values for the different layers storing different reflection characteristics. In some embodiments, for each pixel that bins sensor data representing multiple reflections, a set of features may be calculated, determined, or otherwise selected from reflection characteristics of the reflections (e.g., bearing, azimuth, elevation, range, intensity, reflectivity, SNR, etc.). In some cases, when sensor data representing multiple reflections is binned together in a pixel of a projection image (e.g., a range image), sensor data representing one of the reflections (e.g., the reflection with the closest range) may be represented in the projection image and the sensor data representing the other reflections may be dropped. For example, in a range image with a pixel that bins multiple reflections together, the pixel may store a range value corresponding to the reflection with the closest range. Additionally or alternatively, when there are multiple reflections binned together in a pixel, thereby forming a tower of points, a particular feature for that pixel may be calculated by aggregating a corresponding reflection characteristic for the multiple overlapping reflections (e.g., using standard deviation, average, etc.). Generally, any given pixel may have multiple associated features values, which may be stored in corresponding channels of a tensor. In any event, the sensor data 402 may be encoded 530 into a variety of types of the input data 406 (e.g., a projection image such as a LiDAR range image, a tensor encoding a projection image(s) and corresponding reflection characteristics), and the input data 406 may serve as the input into machine learning model(s) 408.

At a high level, the machine learning model(s) 408 may detect objects such as instances of obstacles, static parts of the environment, and/or other objects represented in the input data 406 (e.g., a LiDAR range image, camera image, and/or other sensor data stacked into corresponding channels of an input tensor). For example, the machine learning model(s) 408 may extract classification data (e.g., the class confidence data 410) and/or object instance data such as location, geometry, and/or orientation data (e.g., the instance regression data 412) representing detected objects in the 3D environment. The classification data and object instance data may be post-processed 414 to generate class labels and 2D and/or 3D bounding boxes, closed polylines, or other bounding shapes identifying the locations, geometry, and/or orientations of the detected object instances.

In some embodiments, the machine learning model(s) 408 may be implemented using a DNN, such as a convolutional neural network (CNN). Although certain embodiments are described with the machine learning model(s) 408 being implemented using neural network(s), and specifically CNN(s), this is not intended to be limiting. For example, and without limitation, the machine learning model(s) 408 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the machine learning model(s) 408 may include a common trunk (or stream of layers) with several heads (or at least partially discrete streams of layers) for predicting different outputs based on the input data 406. For example, the machine learning model(s) 408 may include, without limitation, a feature extractor (e.g., a DNN, an encoder/decoder, etc.) including convolutional layers, pooling layers, and/or other layer types, where the output of the feature extractor is provided as input to a first head for predicting classification data and a second head for predicting location, geometry, and/or orientation of detected objects. The first head and the second head may receive parallel inputs, in some examples, and thus may produce different outputs from similar input data.

Generally, the machine learning model(s) 408 may include feature extractors configured to evaluate images with different views of a 3D environment. For example, the machine learning model(s) 408 may include separate feature extractors in multiple stages chained together to sequentially process data from multiple views of a 3D environment. For example, the machine learning model(s) 408 may include a first stage with a first feature extractor configured to extract classification data from an image with a first view of the environment (e.g., a perspective view), and the output of the first feature extractor may be transformed to a second view of the environment (e.g., a top down view) and fed into a second feature extractor, which may include a common trunk and several heads that extract different outputs such classification data and object instance data for detected objects. Additionally or alternatively, multiple images may be generated with different views, each image may be fed into separate side-by-size feature extractors, and the latent space tensors output by the separate feature extractors may be combined to form classification data and/or object instance data. These architectures are meant as examples, and other architectures are contemplated within the scope of the present disclosure.

Figure 6:
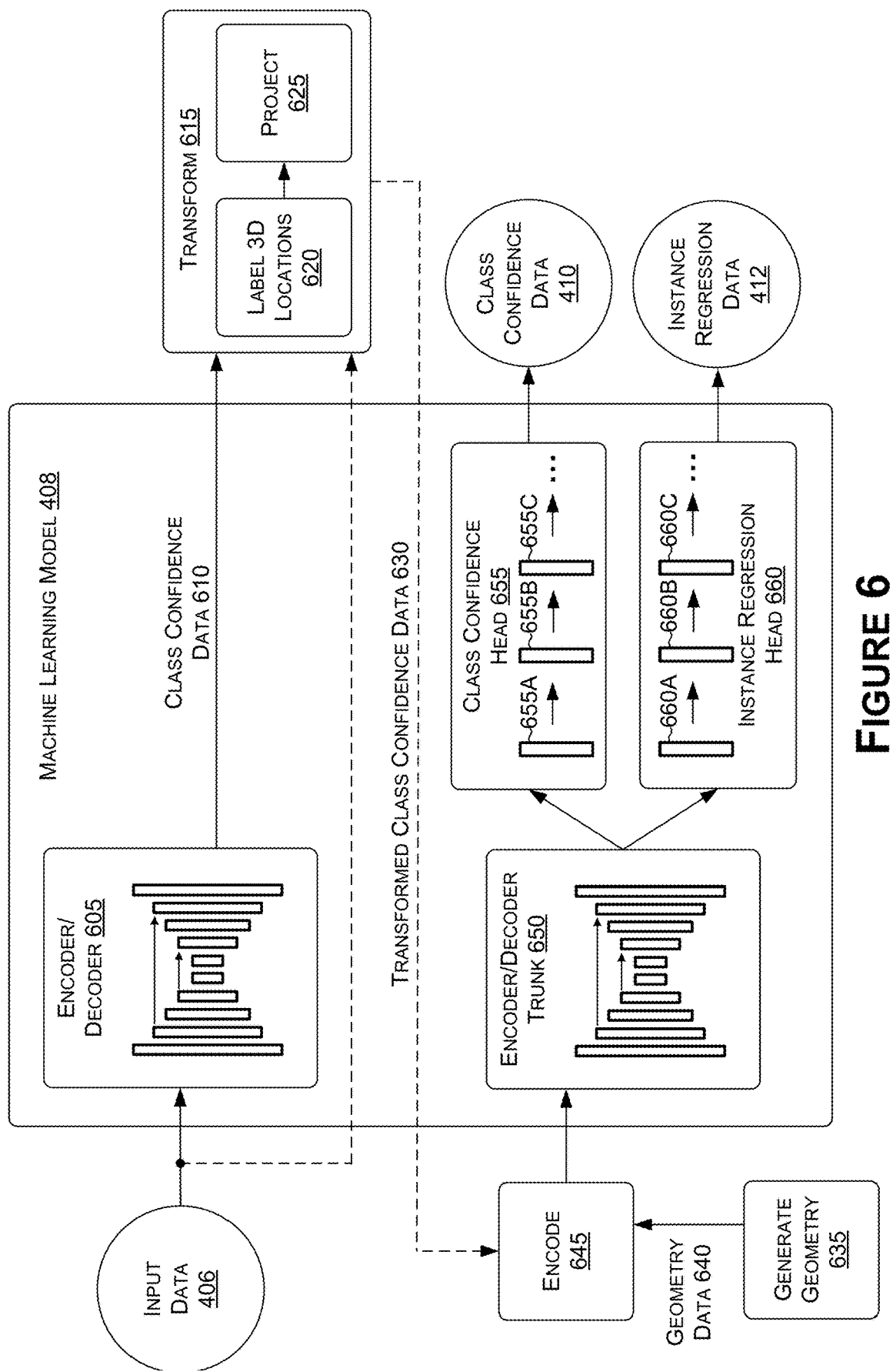
FIG. 6 is an illustration of an example multi-view perception machine learning model(s), in accordance with some embodiments of the present disclosure.

Turning now to FIG. 6, FIG. 6 is an illustration of an example multi-view perception machine learning model(s) (e.g., an example implementation of the machine learning model(s) 408 of FIG. 4), in accordance with some embodiments of the present disclosure. In the example of FIG. 6, the machine learning model(s) 408 is illustrated with an example architecture that includes multiple stages chained together for sequential processing. In the first stage, an encoder/decoder 605 may extract class confidence data 610 (e.g., one or more confidence maps in a first view, such as a perspective view) from the input data 406, and the class confidence data 610 may be transformed 615 into a second view to form transformed class confidence data 630 (e.g., one or more confidence maps in a second view such as a top-down view). This data may be supplemented with geometry data 640 (e.g., representing dimension(s) of object geometry in a direction orthogonal to the two dimensions of the second view, such as height) of objects represented in the sensor data 402. The transformed class confidence data 630 (e.g., one or more confidence maps in a top-down view) and/or geometry data 640 (e.g., one or more height maps) may be encoded 645 (e.g., stacked into corresponding channels of a tensor) and fed into the second stage comprising an encoder/decoder trunk 650 connected to a class confidence head 655 and an instance regression head 660, which may extract class confidence data 610 (e.g., one or more confidence maps in top-down view) and instance regression data 412 (e.g., object instance data such as location, geometry, and/or orientation), respectively.

The encoder/decoder 605 may be implemented using encoder and decoder components with skip connections (e.g., similar to a Feature Pyramid Network, U-Net, etc.). For example, the encoder/decoder 605 may accept input data 406 such as a LiDAR range image and/or an RBG image and may apply various convolutions, pooling, and/or other types of operations to extract class confidence data 610 for any number of supported classes. In an example implementation, the encoder/decoder 605 may include an encoding (contracting) path and a decoding (expansive) path. Along the contracting path, each resolution may include any number of layers (e.g., convolutions, dilated convolutions, inception blocks, etc.) and a downsampling operation (e.g., max pooling). Along the expansive path, each resolution may include any number of layers (e.g., deconvolutions, upsampling followed by convolution(s), and/or other types of operations). In the expansive path, each resolution of a feature map may be upsampled and concatenated (e.g., in the depth dimension) with feature maps of the same resolution from the contracting path. In this example, corresponding resolutions of the contracting and expansive paths may be connected with skip connections, which may be used to add or concatenate feature maps from corresponding resolutions.

The output of the encoder/decoder 605 may be class confidence data 610 for any number of supported classes (e.g., one channel per class). Examples of supported classes may include vehicles (e.g., cars, buses, trucks, etc.), vulnerable road users (e.g., motorcycles, bikes, pedestrians, etc.), environmental parts (e.g., drivable space, sidewalks, buildings, trees, poles, etc.), subclasses thereof (e.g., walking pedestrian), some combination thereof, and/or others. For example, class confidence data 610 may include a representation of one or more confidence maps (e.g., one per class). By way of nonlimiting example, the encoder/decoder 605 may output a tensor with N channels corresponding to N classes (e.g., one confidence map per channel). Thus, each pixel in the tensor may store depth-wise pixel values representing a probability, score, or logit that the pixel is part of a corresponding class for each channel. In some embodiments, the sum of depth-wise pixel values may be normalized to some value (e.g., 1). In some embodiments, the predicted values may be used to generate different class segmentation masks for each class (channel), and/or may be collapsed into a single composite segmentation mask where each pixel contains a class label (e.g., represented by different integer). In the embodiment illustrated in FIG. 6, the encoder/decoder 605 outputs class confidence data 610 (e.g., one or more confidence maps), however, in other embodiments, the encoder/decoder 605 may additionally or alternatively output other types of classification data (e.g., N class segmentation masks storing a binary value for each pixel, a composite segmentation mask storing a most likely class label for each pixel).

Generally, the output of the encoder/decoder 605 (e.g., the class confidence data 610 or other classification data) may be transformed 615 from a first view to a second view of the environment. For example, classification data extracted by the encoder/decoder 605 may be used to label 620 corresponding 3D locations in the environment, and the labeled 3D locations may be projected 625 into the second view.

Taking a confidence map for a particular class as an example, the confidence map may have spatial dimensions corresponding to an input into the encoder/decoder 605 (e.g., a LiDAR range image), and the confidence map may include a classification value for each pixel (e.g., a probability, score, or logit). In some cases, the classification values may be mapped to known 3D locations identified by corresponding sensor data 402 and/or input data 406. For example, a corresponding input LiDAR range image may have a known correspondence between range scan pixels and corresponding points in a LiDAR point cloud (LiDAR detections), which may have known 3D locations. Thus, a classification value from a predicted confidence map may be associated with a 3D location of a LiDAR detection represented by a corresponding range scan pixel in the input LiDAR range image.

In another example, assume the input into the encoder/decoder 605 includes a representation of an RGB image generated by a camera, and the encoder/decoder 605 classifies each pixel of the RGB image by generating one or more classification values for each pixel. The classification values may be associated with 3D locations identified from some other sensor data, such as LiDAR or RADAR detections, or 3D locations from a 3D representation of the environment such as 3D map of the environment. For example, LiDAR or RADAR data captured in the same time slice as the input RGB image may be projected to form a range image with the same view as the input RGB image. In this case, a classification value from a predicted confidence map may be associated with 3D locations in a similar manner as the previous example, by identifying the 3D location of a sensor detection (e.g., a point in a point cloud) represented by a corresponding range scan pixel in the range image. In another example, image data generated by a sensor (e.g., an RGB image generated by a camera) with a known orientation and location in a 3D representation of the environment (e.g., a 3D map or some other world space) may be un-projected into the world space to identify 3D locations of objects in the world space corresponding to each pixel. These are just a few examples, and other variations may be implemented within the scope of the present disclosure.

As such, 3D locations from sensor data for a corresponding time slice (e.g., sensor data 402) or from a corresponding portion of a 3D representation of the environment may be labeled 620 with classification data (e.g., classification values, labels) extracted by the encoder/decoder 605. The labeled 3D locations may be projected 625 into a second view of the environment, for example, by orthographically projecting the labeled 3D locations to form a projection image with desired spatial dimensions and ground sampling distance (e.g., an overhead image with a top-down view). In one example implementation, a semantically labelled range image may be transformed into a top-down representation.

In some cases, projecting 625 the labeled 3D locations may simply involve collapsing the labeled 3D locations into a plane or otherwise (e.g., orthographically) projecting the labeled 3D locations into a projection image (e.g., by collapsing a point cloud into a plane by throwing away the z-value of the labeled points). In some cases, projecting 625 the labeled 3D locations may involve multiple points being binned together in a pixel of a projection image. As such, when multiple points are binned together in a pixel of a projection image (e.g., a top-down image), any technique may be used to select or otherwise represent one or more of the points (e.g., select one of the points such as the highest or lowest point). In some cases, filtering may be applied (e.g., by omitting points above 3 or 4 meters). Each pixel of the resulting projection image where a projected 3D location lands may store the extracted classification data with which the 3D location was labeled (e.g., a classification value or label).

Thus, the result may be transformed classification data (e.g. a transformed confidence map or segmentation mask) representing the extracted classification data in a second view of the environment. Generally, any number confidence maps (e.g., N confidence maps storing a classification value for each pixel in a corresponding class), individual class segmentation masks (e.g., N class segmentation masks storing a binary value indicating each pixel in a corresponding class), and/or a composite segmentation mask (e.g., with a single channel storing labels of the most likely class for each pixel) may be transformed 615. If the classification data being transformed has N channels, the transformed classification data may have N corresponding channels. In the embodiment illustrated in FIG. 6, the class confidence data 610 (e.g., one or more confidence maps in a perspective view) may be transformed to form transformed class confidence data 630 (e.g., one or more confidence maps in a top down view). However, in other embodiments, other types of classification data (e.g., N class segmentation masks storing a binary value for each pixel, a composite segmentation mask storing a most likely class label for each pixel) may additionally or alternatively be transformed 615.

Generally, the transformed classification data 630 may represent the second view of the environment, so the transformed classification data may reveal object characteristics (e.g., location, geometry, orientation) in the two dimensions represented by the second view. In some embodiments, geometry data 640 representing object characteristics (e.g., orthogonal to the second view) may be generated 635 from sensor data for a corresponding time slice (e.g., the sensor data 402). For example, sensor data representing 3D locations of detected objects in the environment may be sampled or otherwise processed to represent characteristics of the detected objects in a particular dimension (e.g., the orthogonal dimension), for example, by taking one or more slices of the sensor data in the particular dimension. Taking a LiDAR or RADAR point cloud where the second view is a top-down view as an example, one or more slices of the point cloud may be taken in the height dimension to generate geometry data 640 having a planer representation of the detected objects, such as minimum and maximum height maps. In this example, each pixel of such a map may represent a column in the top-down view. If sensor data representing multiple objects in the 3D environment is binned together in a single pixel (e.g., multiple points from a point cloud are in a column represented by the pixel), any type of sampling or statistical metric may be used to represent the collection of data (e.g., the points in the column). For example, each pixel may store the minimum height of all points in the column (e.g., a minimum height map), the maximum height of all points in the column (e.g., a maximum height map), the median height of all points in the column, the mean height of all points in the column, the variance of the height of all points in the column, and/or others. As such, one or more slices of the geometry data 640 (e.g., height data) having a planer representation of detected objects in the environment may be generated 635.

In another example, the geometry data 640 of objects in the environment may be generated 635 from image data (e.g., an RGB image) generated by a sensor (e.g., a camera). For example, a known orientation and location of the sensor that captured the image data may be used to un-project the image data into a 3D representation of the environment (e.g., a 3D map or some other world space) and identify 3D locations of objects in the world space corresponding to each pixel. In this case, one or more slices of the identified 3D locations may be taken to generate 635 the geometry data 640 (one or more height maps).

Generally, the transformed classification data (e.g., the transformed class confidence data 630) and/or the geometry data (e.g., the geometry data 640) may be encoded 645 or otherwise organized into some suitable representation for the encoder/decoder trunk 650. For example, in embodiments in which the transformed class confidence data 630 includes N transformed confidence maps and the geometry data 640 includes M height maps, the transformed class confidence data 630 and the geometry data 640 may be encoded 645 into a tensor with N channels for the N confidence maps and M channels for the M height maps. This is simply an example, and any suitable representation of the transformed classification data and/or the geometry data may be implemented.

The second stage of the machine learning model(s) 408 of FIG. 6 includes the encoder/decoder trunk 650, the class confidence head 655, and the instance regression head 660. The second stage may extract features from a representation of the transformed classification data and/or geometry data (e.g. a tensor having M+N channels), and may perform class segmentation and/or regress instance geometry in the second view.

The encoder/decoder trunk 650 may be implemented using encoder and decoder components with skip connections (e.g., similar to a Feature Pyramid Network, U-Net, etc.). For example, the encoder/decoder trunk 650 may accept a representation of the transformed class confidence data 630 and/or the geometry data 640, and apply various convolutions, pooling, and/or other types of operations to extract features into some latent space. In FIG. 6, the encoder/decoder trunk 650 is illustrated with an example implementation involving an encoding (contracting) path and an example decoding (expansive) path. Along the contracting path, each resolution may include any number of layers (e.g., convolutions, dilated convolutions, inception blocks, etc.) and a downsampling operation (e.g., max pooling). Along the expansive path, each resolution may include any number of layers (e.g., deconvolutions, upsampling followed by convolution(s), and/or other types of operations). In the expansive path, each resolution of a feature map may be upsampled and concatenated (e.g., in the depth dimension) with feature maps of the same resolution from the contracting path. In this example, corresponding resolutions of the contracting and expansive paths may be connected with skip connections, which may be used to add or concatenate feature maps from corresponding resolutions. As such, the encoder/decoder trunk 650 may extract features into some latent space tensor, which may be input into the class confidence head 655 and the instance regression head 660.

The class confidence head 655 may include any number of layers 655A, 655B, 655C (e.g., convolutions, pooling, classifiers such as softmax, and/or other types of operations, etc.) that predict classification data from the output of the encoder/decoder trunk 650. For example, the class confidence head 655 may include a channel (e.g., a stream of layers plus a classifier) for each class of object to be detected (e.g., vehicles, cars, trucks, vulnerable road users, pedestrians, cyclists, motorbikes, drivable space, sidewalks, buildings, trees, poles, subclasses thereof, some combination thereof, etc.), such that the class confidence head 655 extracts classification data (e.g., class confidence data 410) in any suitable form. For example, the class confidence head 655 may predict a confidence map that represents an inferred confidence level of whether a particular object is present (regardless of class), separate confidence maps for each class, and/or the like. In some embodiments, the class confidence data 410 predicted by the class confidence head 655 may take the form of a multi-channel tensor where each channel may be thought of as a heat map storing classification values (e.g., probability, score, or logit) that each pixel belongs to the class corresponding to the channel.

The instance regression head 660 may include any number of layers 660A, 660B, 660C (e.g., convolutions, pooling, classifiers such as softmax, and/or other types of operations, etc.) that predict object instance data (such as location, geometry, and/or orientation of detected objects) from the output of the encoder/decoder trunk 650. The instance regression head 660 may include N channels (e.g., streams of layers plus a classifier), where each channel regresses a particular type of information about a detected object instance, such as where the object is located (e.g., dx/dy vector pointing to center of the object), object height, object width, object orientation (e.g., rotation angle such as sine and/or cosine), some statistic measure thereof (e.g., minimum, maximum, mean, median, variance, etc.), and/or the like. By way of non-limiting example, instance regression head 660 may include separate dimensions identifying the x-dimension of the center of a detected object, the y-dimension of the center of a detected object, the width of a detected object, the height of a detected object (e.g., displacement from the ground), the sine of the orientation of a detected objected (e.g., a rotation angle in 2D image space), the cosine of the orientation of a detected object, and/or other types of information. These types of object instance data are meant merely as an example, and other types of object information may additionally or alternatively be regressed. The instance regression head 660 may include separate regression channels for each class, or one set of channels for all classes. In some embodiments, the instance regression data 412 predicted by the instance regression head 660 may take the form of a multi-channel tensor where each channel may include floating-point numbers that regress a particular type of object information such as a particular object dimension.

As such, the machine learning model(s) 408 may predict multi-channel classification data (e.g., class confidence data 410) and/or multi-channel object instance data (e.g., instance regression data 412) from a particular input (e.g., input data 406). Some possible training techniques are described in more detail below. In operation, the outputs of the machine learning model(s) 408 may be post-processed (e.g., decoded) to generate bounding boxes, closed polylines, or other bounding shapes identifying the locations, geometry, and/or orientations of the detected object instances. For example, when the machine learning model(s) 408 predicts class confidence data 410 and/or instance regression data 412 with respect to a particular view of the environment (e.g., a top-down view), the bounding boxes, closed polylines, or other bounding shapes may be identified with respect to that view (e.g., in the same image space as the input into the second stage of the machine learning model(s) 408). In some embodiments, since the object instance data may be noisy and/or may produce multiple candidates, bounding shapes may be generated using non-maximum suppression, density-based spatial clustering of application with noise (DBSCAN), and/or another function.

Figure 7:
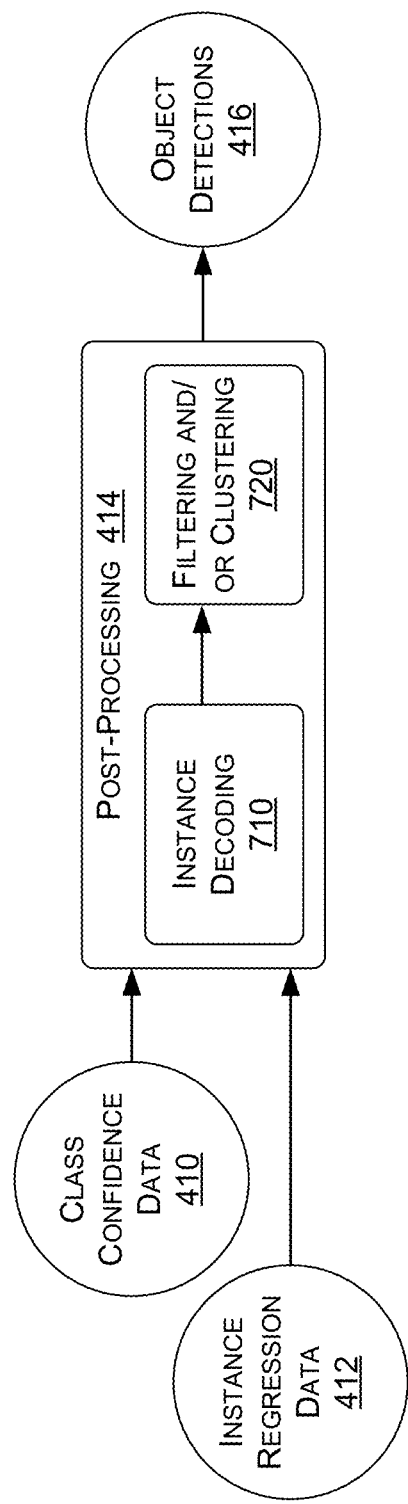
FIG. 7 is a data flow diagram illustrating an example post-processing process for generating object detections in an object detection system, in accordance with some embodiments of the present disclosure.

FIG. 7 is a data flow diagram illustrating an example post-processing process 414 for generating object detections 416 in an object detection system, in accordance with some embodiments of the present disclosure. In this example, the post-processing process 414 includes instance decoding 710 and filtering and/or clustering 720. Generally, the instance decoding 710 may identify 2D and/or 3D candidate bounding boxes (or other bounding shapes) (e.g., for each object class) based on object instance data (e.g., location, geometry, and/or orientation data) from the corresponding channels of the instance regression data 412 and/or a confidence map or mask from a corresponding channel of classification data (e.g., class confidence data 410) for that class. More specifically, a predicted confidence map and predicted object instance data may specify information about detected object instances, such as where the object is located, object height, object width, object orientation, and/or the like. This information may be used to identify candidate object detections (e.g., candidates having a unique center point, object height, object width, object orientation, and/or the like). The result may be a set of 2D and/or 3D candidate bounding boxes (or other bounding shapes) for each object class.

Various types of filtering and/or clustering 720 may be applied to remove duplication and/or noise from the candidate bounding boxes (or other bounding shapes) for each object class. For example, in some embodiments, duplicates may be removed using non-maximum suppression. Non-maximum suppression may be used where two or more candidate bounding boxes have associated confidence values that indicate the candidate bounding boxes may correspond to the same object instance. In such examples, the confidence value that is the highest for the object instance may be used to determine which candidate bounding box to use for that object instance, and non-maximum suppression may be used to remove, or suppress, the other candidates.

For example, each candidate bounding box (or other bounding shape) may be associated with a corresponding confidence/probability value associated with one or more corresponding pixels from a corresponding channel of the class confidence data 410 for the class being evaluated (e.g., using the confidence/probability value of a representative pixel such as a center pixel, using an averaged or some other composite value computed over the candidate region, etc.). Thus, candidate bounding shapes that have a confidence/probability of being a member of the object class less than some threshold (e.g., 50%) may be filtered out. Additionally or alternatively, a candidate bounding box (or other shape) with the highest confidence/probability score for a particular class may be assigned an instance ID, a metric such as intersection over union (IoU) may be calculated with respect to each of the other candidates in the class, and candidates having an IoU above some threshold may be filtered out to remove duplicates. The process may be repeated, assigning the candidate having the next highest confidence/probability score an instance ID, removing duplicates, and repeating until there are no more candidates remaining. The process may be repeated for each of the other classes to remove duplicate candidates.

In some embodiments, a clustering approach such as density-based spatial clustering of applications with noise (DBSCAN) may be used to remove duplicate candidate bounding shapes. For example, candidate bounding shapes may be clustered (e.g., the centers of the candidate bounding shapes may be clustered), candidates in each cluster may be determined to correspond to the same object instance, and duplicate candidates from each cluster may be removed.

As such, the extracted classification data and/or object instance data may be decoded (e.g., via instance decoding 710), filtered and/or clustered (e.g., via filtering and/or clustering 720) to identify bounding boxes, closed polylines, or other bounding shapes for detected objects in each particular class (e.g., based on data from corresponding channels of class confidence data 410 and instance regression data 412). A class label may be applied to each identified bounding shape based on the particular class being evaluated (e.g., based on a known mapping between channels and class labels). In some cases, 2D bounding shapes may initially be determined and the third dimension (e.g., height) for each of the 2D bounding shapes may be inferred from the extracted object instance data (e.g., based on a particular regression channel for object height, based on separate regression channels for minimum and maximum values in the height dimension, etc.). As such, 2D and/or 3D bounding shapes and class labels may be identified for detected objects in the environment.

To summarize, a machine learning model(s) 408 may accept a representation of sensor data with a first view such as a LiDAR range image, perform segmentation on the representation of sensor data to extract classification data, transform the classification data to representation with a second view, and perform segmentation and instance regression on the second view to extract classification data and/or object instance data. The extracted classification data and/or object instance data may be post-processed to generate class labels and 2D and/or 3D bounding boxes, closed polylines, or other bounding shapes identifying the locations, sizes, and/or orientations of detected object instances in the projection image.

Figure 8:
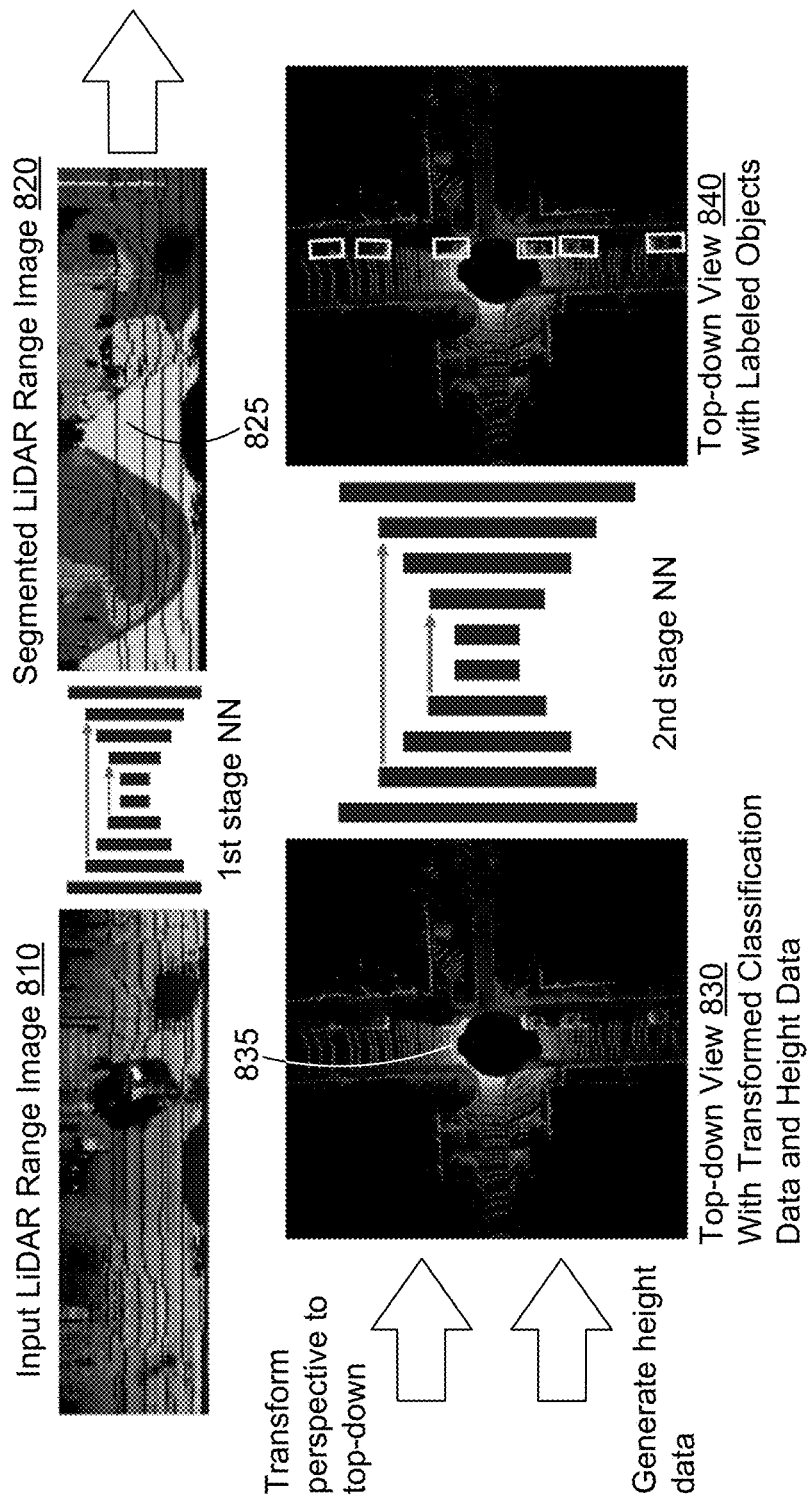
FIG. 8 is an illustration of an example data flow through an example multi-view perception machine learning model(s), in accordance with some embodiments of the present disclosure.

FIG. 8 is an illustration of an example data flow through an example multi-view perception machine learning model(s), in accordance with some embodiments of the present disclosure. In FIG. 8, a LiDAR range image 810 is input into a first stage of a neural network (e.g., the encoder/decoder 605 of FIG. 6), which segments the LiDAR range image to generate a segmented LiDAR range image 820. The segmented LiDAR range image 820 is transformed to a top-down view 830, stacked with height data, and fed through a second stage of the neural network (e.g., the encoder/decoder trunk 650, class confidence head 655, and instance regression head 660 of FIG. 6). Note that the classified regions of the segmented LiDAR range image 820 (e.g., the drivable space 825) has been transformed to a corresponding region in the top-down view 830 (e.g., the transformed drivable space 835). The second stage of the neural network extracts classification data and object instance data, which is post-processed to generate bounding boxes for detected objects.

Once the locations, geometry, orientations, and/or class labels of object instances have been determined, 2D pixel coordinates defining the object instances may be converted to 3D world coordinates for use with corresponding class labels by the autonomous vehicle in performing one or more operations (e.g., obstacle avoidance, lane keeping, lane changing, path planning, mapping, etc.). In some embodiments, a low-level LiDAR perception stack that does not use a DNN may process sensor data to detect objects in parallel to the machine learning model(s) 408 (e.g., for redundancy). As such, returning to FIG. 4, the object detections 416 (e.g., bounding boxes, closed polylines, or other bounding shapes) may be used by control component(s) of the autonomous vehicle 1600 depicted in FIGS. 16A-16D, such as an autonomous driving software stack 422 executing on one or more components of the vehicle 1600 (e.g., the SoC(s) 1604, the CPU(s) 1618, the GPU(s) 1620, etc.). For example, the vehicle 1600 may use this information (e.g., instances of obstacles) to navigate, plan, or otherwise perform one or more operations (e.g., obstacle avoidance, lane keeping, lane changing, merging, splitting, etc.) within the environment.

In some embodiments, the object detections 416 may be used by one or more layers of the autonomous driving software stack 422 (alternatively referred to herein as "drive stack 422"). The drive stack 422 may include a sensor manager (not shown), perception component(s) (e.g., corresponding to a perception layer of the drive stack 422), a world model manager 426, planning component(s) 428 (e.g., corresponding to a planning layer of the drive stack 422), control component(s) 430 (e.g., corresponding to a control layer of the drive stack 422), obstacle avoidance component(s) 432 (e.g., corresponding to an obstacle or collision avoidance layer of the drive stack 422), actuation component(s) 434 (e.g., corresponding to an actuation layer of the drive stack 422), and/or other components corresponding to additional and/or alternative layers of the drive stack 422. The process 400 may, in some examples, be executed by the perception component(s), which may feed up the layers of the drive stack 422 to the world model manager, as described in more detail herein.

The sensor manager may manage and/or abstract the sensor data 402 from the sensors of the vehicle 1600. For example, and with reference to FIG. 16C, the sensor data 402 may be generated (e.g., perpetually, at intervals, based on certain conditions) by RADAR sensor(s) 1660. The sensor manager may receive the sensor data 402 from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1600 may use the uniform format, thereby simplifying processing of the sensor data 402. In some examples, the sensor manager may use a uniform format to apply control back to the sensors of the vehicle 1600, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 426 may be used to generate, update, and/or define a world model. The world model manager 426 may use information generated by and received from the perception component(s) of the drive stack 422 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 426 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 428, control component(s) 430, obstacle avoidance component(s) 432, and/or actuation component(s) 434 of the drive stack 422. The obstacle perceiver may perform obstacle perception that may be based on where the vehicle 1600 is allowed to drive or is capable of driving (e.g., based on the location of the drivable paths defined by avoiding detected obstacles), and how fast the vehicle 1600 can drive without colliding with an obstacle (e.g., an object, such as a structure, entity, vehicle, etc.) that is sensed by the sensors of the vehicle 1600 and/or the machine learning model(s) 408.

The path perceiver may perform path perception, such as by perceiving nominal paths that are available in a particular situation. In some examples, the path perceiver may further take into account lane changes for path perception. A lane graph may represent the path or paths available to the vehicle 1600, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 1600 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1600 of static or stationary infrastructure objects and obstacles. The map perceiver may also generate information for the wait perceiver and/or the path perceiver, for example, such as to determine which light at an intersection has to be green for the vehicle 1600 to take a particular path.

Figure 16A:
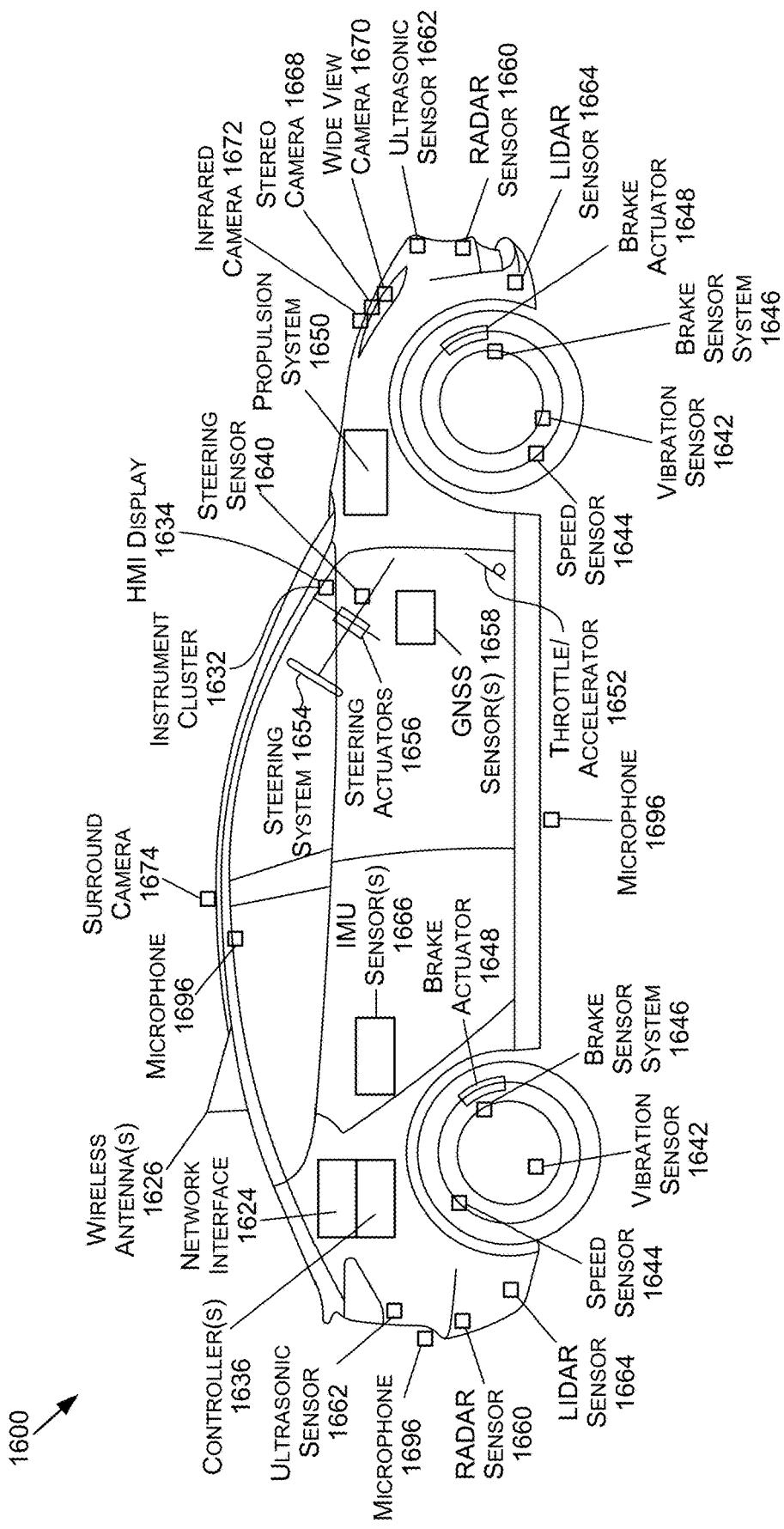
FIG. 16A is an illustration of an example autonomous vehicle, in accordance with some embodiments of the present disclosure.
Figure 16B:
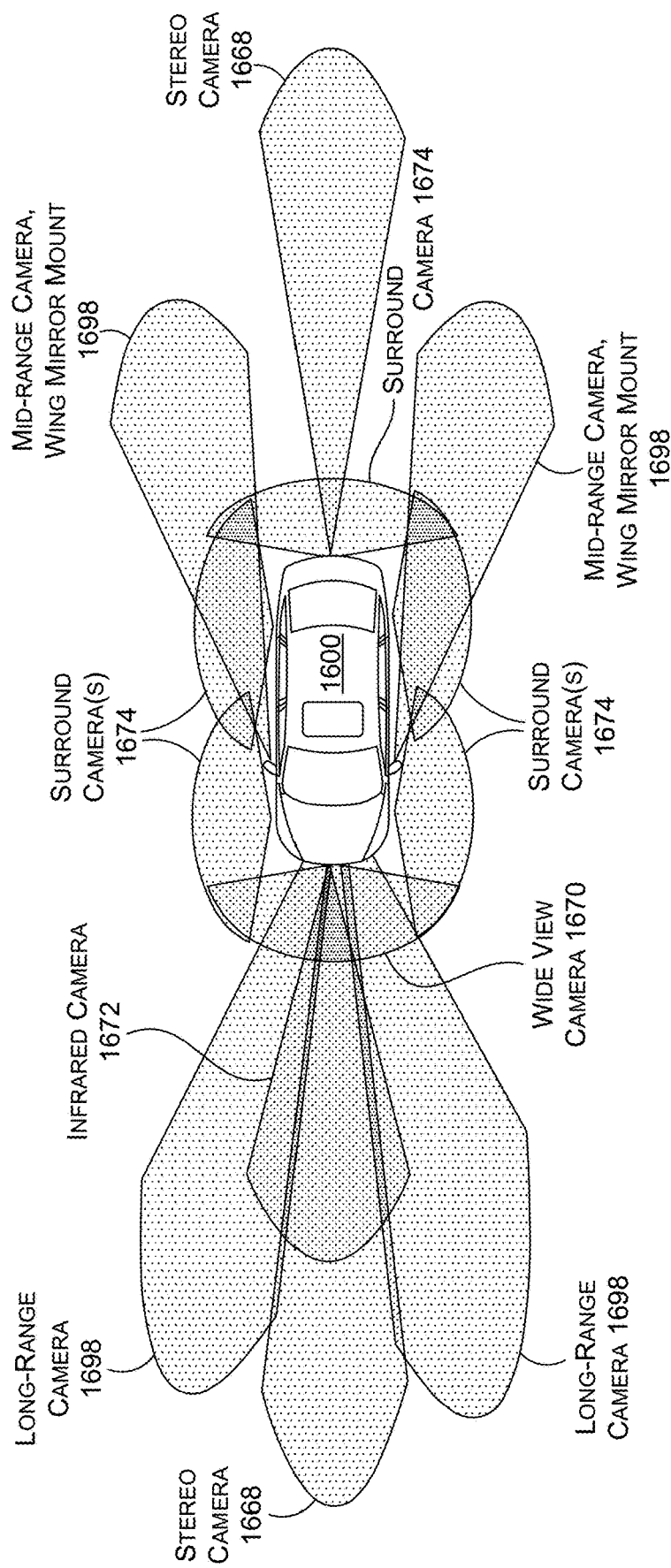
FIG. 16B is an example of camera locations and fields of view for the example autonomous vehicle of FIG. 16A, in accordance with some embodiments of the present disclosure.
Figure 16C:
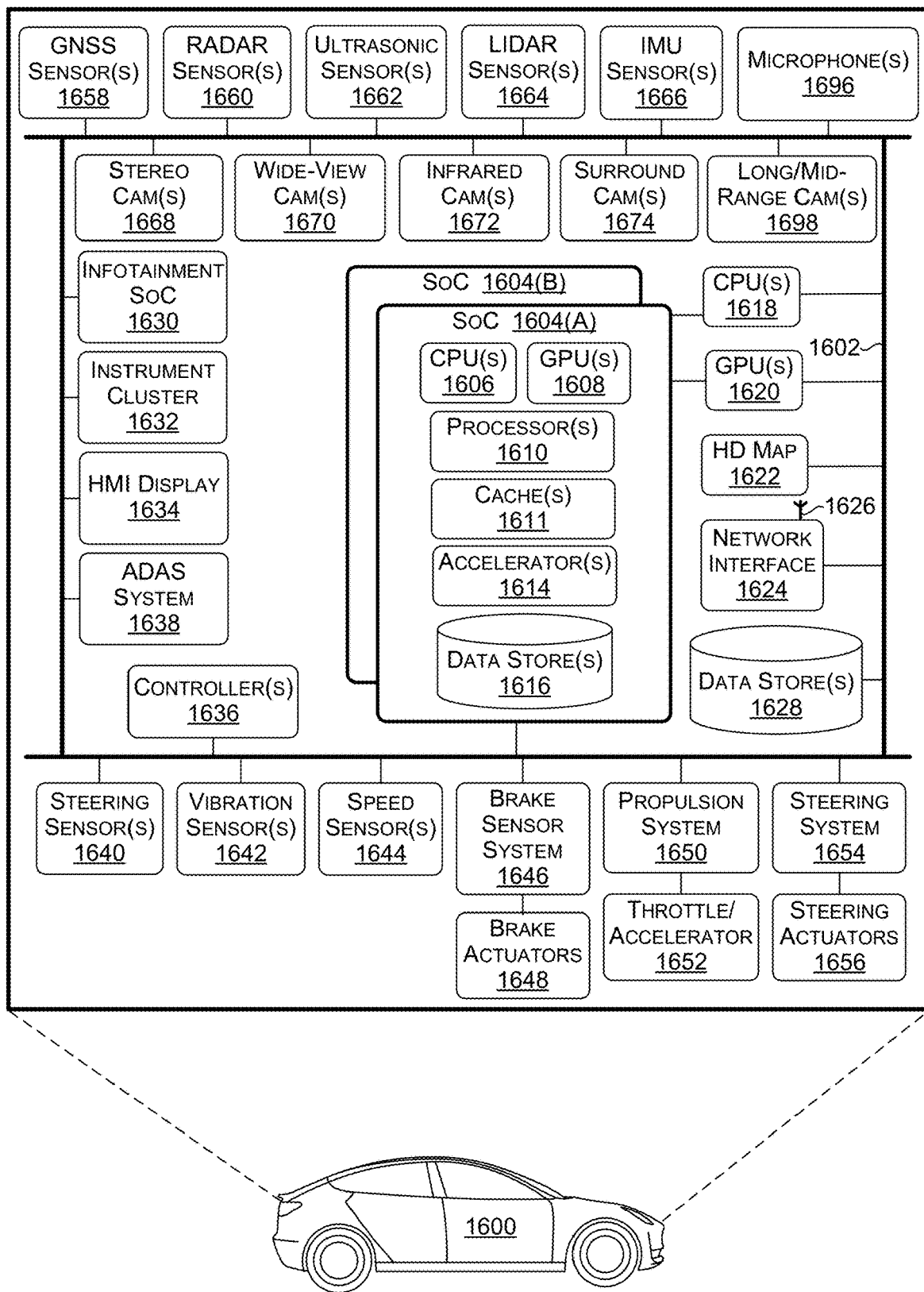
FIG. 16C is a block diagram of an example system architecture for the example autonomous vehicle of FIG. 16A, in accordance with some embodiments of the present disclosure.
Figure 16D:
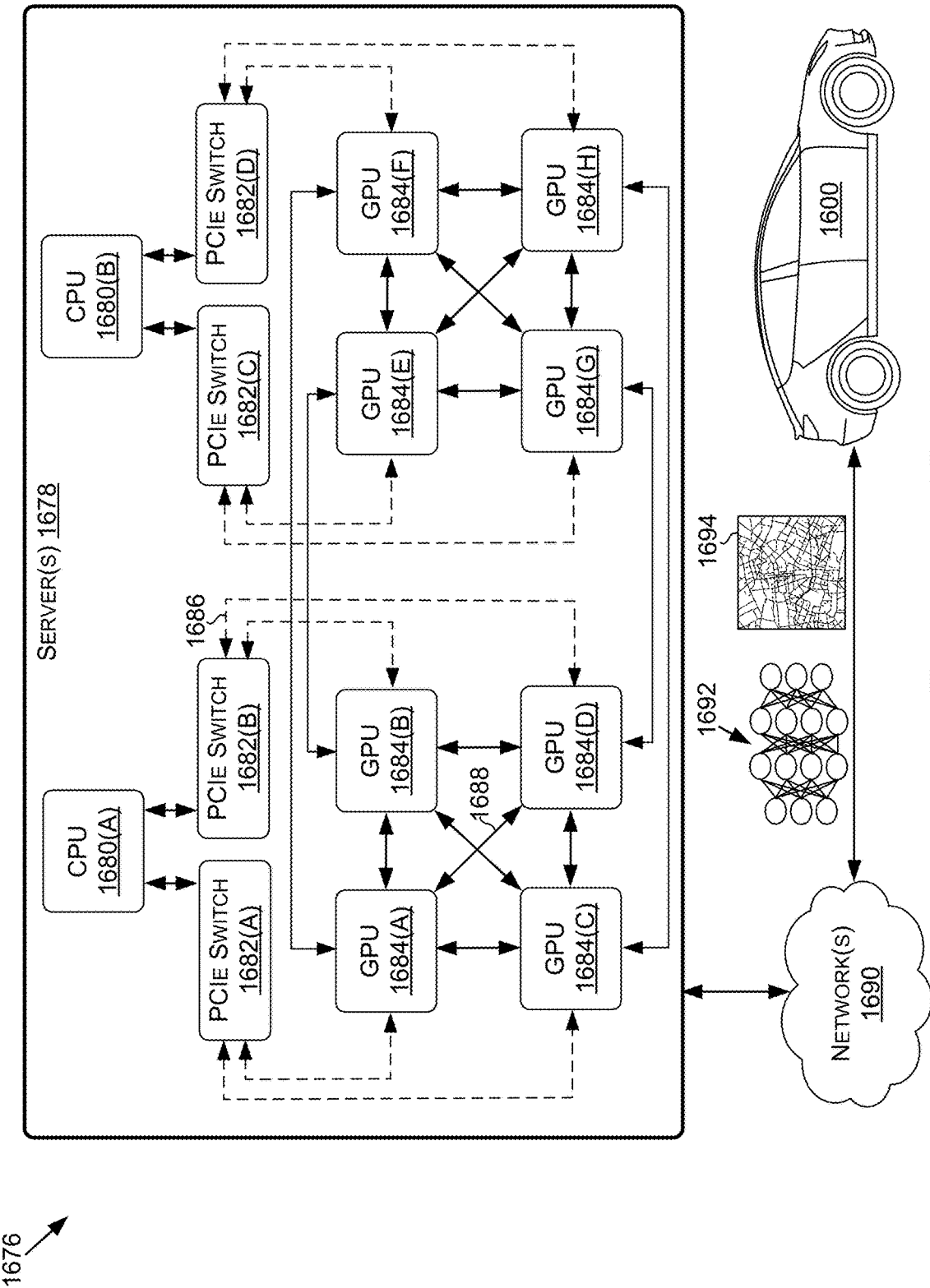
FIG. 16D is a system diagram for communication between cloud-based server(s) and the example autonomous vehicle of FIG. 16A, in accordance with some embodiments of the present disclosure.

In some examples, information from the map perceiver may be sent, transmitted, and/or provided to server(s) (e.g., to a map manager of server(s) 1678 of FIG. 16D), and information from the server(s) may be sent, transmitted, and/or provided to the map perceiver and/or a localization manager of the vehicle 1600. The map manager may include a cloud mapping application that is remotely located from the vehicle 1600 and accessible by the vehicle 1600 over one or more network(s). For example, the map perceiver and/or the localization manager of the vehicle 1600 may communicate with the map manager and/or one or more other components or features of the server(s) to inform the map perceiver and/or the localization manager of past and present drives or trips of the vehicle 1600, as well as past and present drives or trips of other vehicles. The map manager may provide mapping outputs (e.g., map data) that may be localized by the localization manager based on a particular location of the vehicle 1600, and the localized mapping outputs may be used by the world model manager 426 to generate and/or update the world model.

The planning component(s) 428 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1600, etc. The waypoints may be representative of a specific distance into the future for the vehicle 1600, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1600, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 430 may follow a trajectory or path (lateral and longitudinal) that has been received from the behavior selector (e.g., based on object detections 416) of the planning component(s) 428 as closely as possible and within the capabilities of the vehicle 1600. The control component(s) 430 may use tight feedback to handle unplanned events or behaviors that are not modeled and/or anything that causes discrepancies from the ideal (e.g., unexpected delay). In some examples, the control component(s) 430 may use a forward prediction model that takes control as an input variable, and produces predictions that may be compared with the desired state (e.g., compared with the desired lateral and longitudinal path requested by the planning component(s) 428). The control(s) that minimize discrepancy may be determined.

Although the planning component(s) 428 and the control component(s) 430 are illustrated separately, this is not intended to be limiting. For example, in some embodiments, the delineation between the planning component(s) 428 and the control component(s) 430 may not be precisely defined. As such, at least some of the components, features, and/or functionality attributed to the planning component(s) 428 may be associated with the control component(s) 430, and vice versa. This may also hold true for any of the separately illustrated components of the drive stack 422.

The obstacle avoidance component(s) 432 may aid the autonomous vehicle 1600 in avoiding collisions with objects (e.g., moving and stationary objects). The obstacle avoidance component(s) 432 may include a computational mechanism at a "primal level" of obstacle avoidance, and may act as a "survival brain" or "reptile brain" for the vehicle 1600. In some examples, the obstacle avoidance component(s) 432 may be used independently of components, features, and/or functionality of the vehicle 1600 that is required to obey traffic rules and drive courteously. In such examples, the obstacle avoidance component(s) may ignore traffic laws, rules of the road, and courteous driving norms in order to ensure that collisions do not occur between the vehicle 1600 and any objects. As such, the obstacle avoidance layer may be a separate layer from the rules of the road layer, and the obstacle avoidance layer may ensure that the vehicle 1600 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable paths and/or object detections 416 may be used by the obstacle avoidance component(s) 432 in determining controls or actions to take. For example, the drivable paths may provide an indication to the obstacle avoidance component(s) 432 of where the vehicle 1600 may maneuver without striking any objects, structures, and/or the like, or at least where no static structures may exist.

In non-limiting embodiments, the obstacle avoidance component(s) 432 may be implemented as a separate, discrete feature of the vehicle 1600. For example, the obstacle avoidance component(s) 432 may operate separately (e.g., in parallel with, prior to, and/or after) the planning layer, the control layer, the actuation layer, and/or other layers of the drive stack 422.

As such, the vehicle 1600 may use this information (e.g., as the edges, or rails of the paths) to navigate, plan, or otherwise perform one or more operations (e.g. lane keeping, lane changing, merging, splitting, etc.) within the environment.

Figure 9:
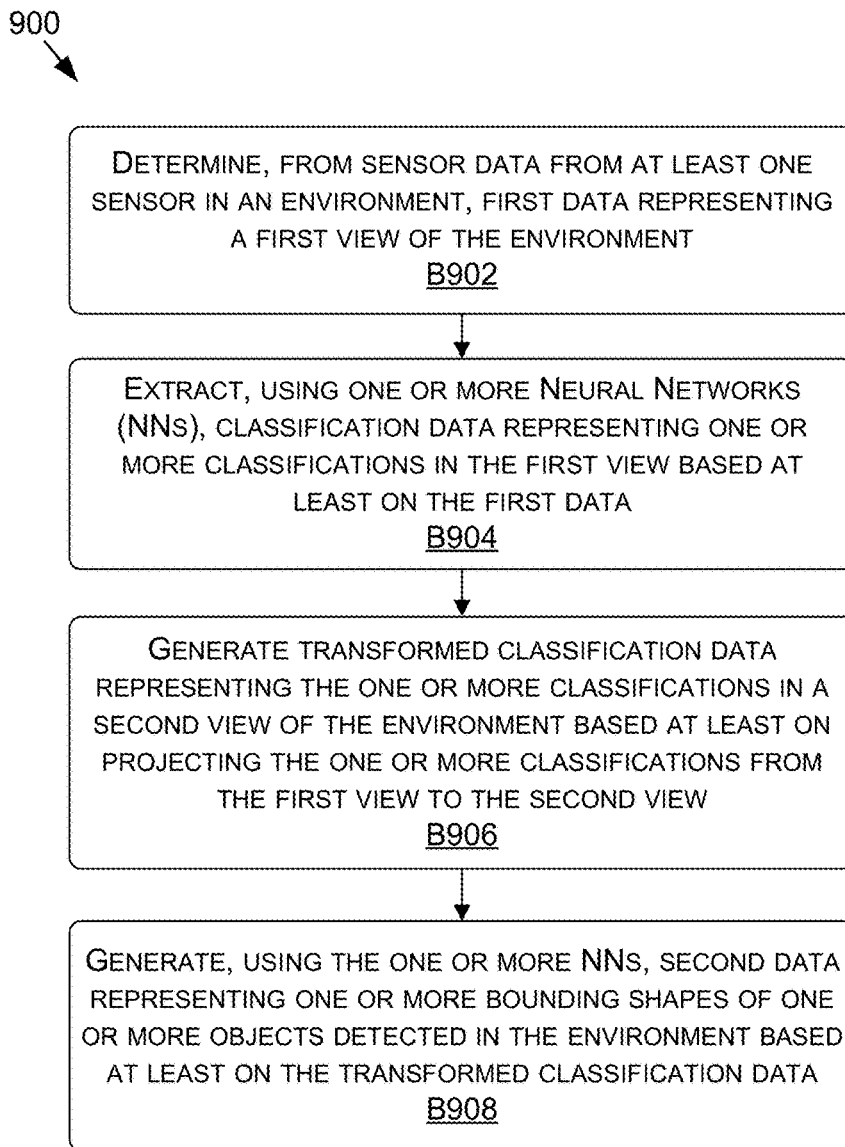
FIG. 9 is a flow diagram showing a method for multi-view object detection using sensor data, in accordance with some embodiments of the present disclosure.
Figure 10:
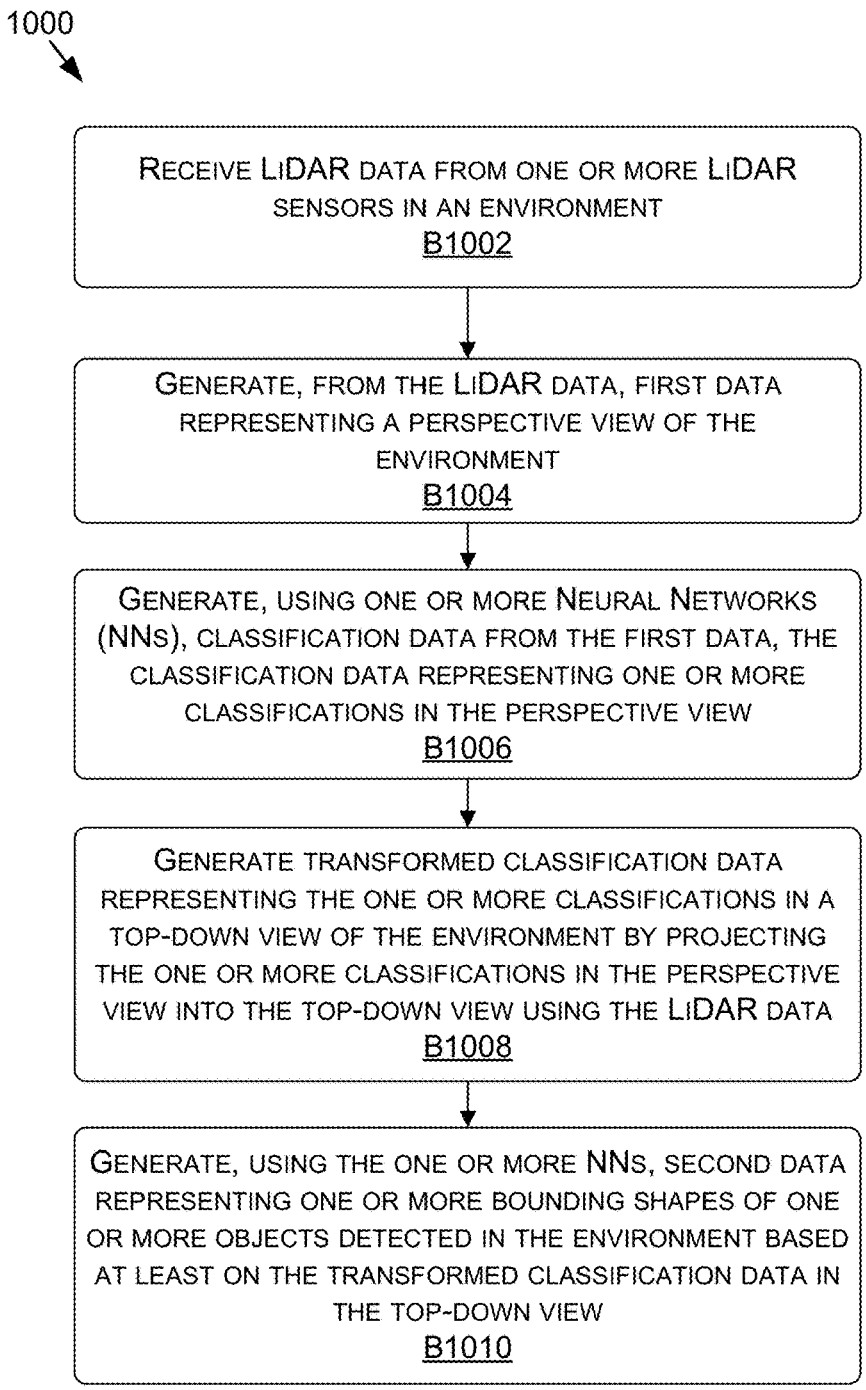
FIG. 10 is a flow diagram showing a method for perspective and top-down view object detection using LiDAR data, in accordance with some embodiments of the present disclosure.
Figure 11:
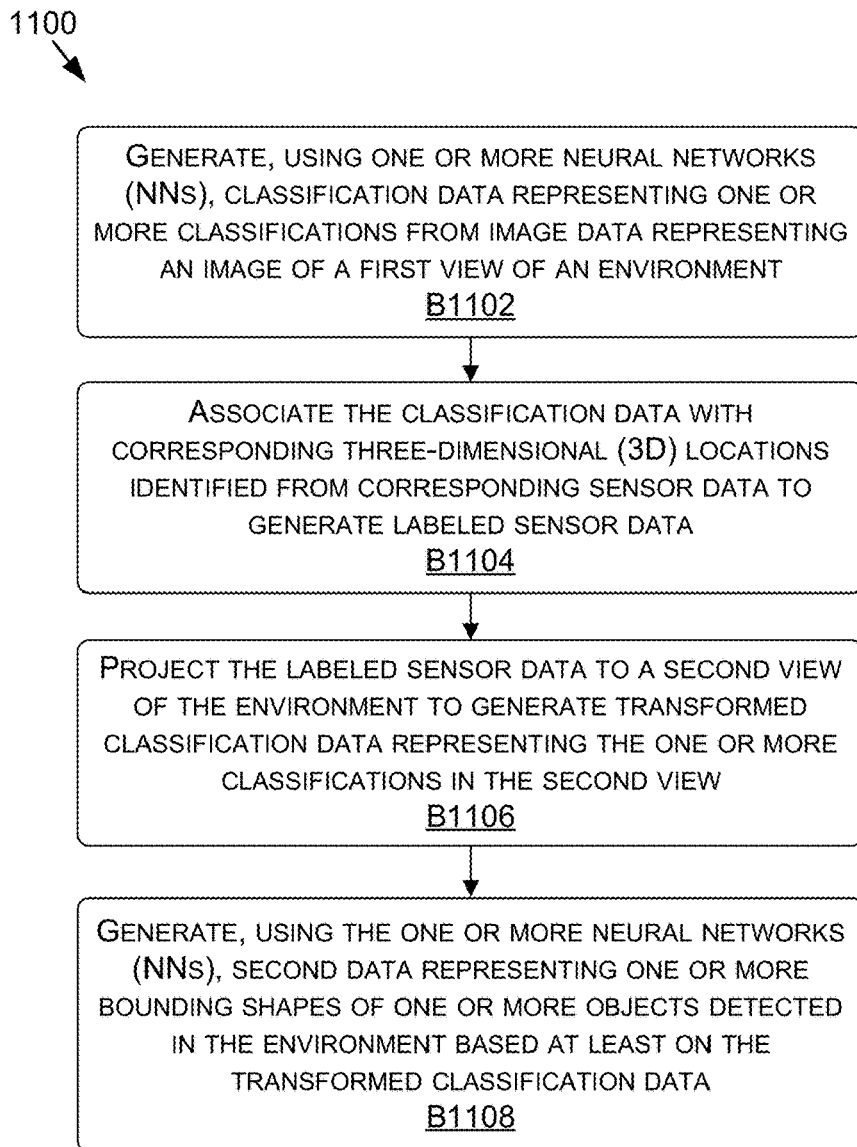
FIG. 11 is a flow diagram showing a method for multi-view object detection involving projection of labeled sensor data, in accordance with some embodiments of the present disclosure.

Now referring to FIGS. 9-11, each block of methods 900, 1000, and 1100, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 900, 1000, and 1100 are described, by way of example, with respect to the object detection system described herein. However, these methods may additionally or alternatively be executed by any one system, or any combination of systems, including, but not limited to, those described herein.

FIG. 9 is a flow diagram showing a method 900 for multi-view object detection using sensor data, in accordance with some embodiments of the present disclosure. The method 900, at block B902, includes determining, from sensor data from at least one sensor in an environment, first data representing a first view of the environment. For example, the sensors 401 of FIG. 4—such as LiDAR sensor(s) 1664 of the autonomous vehicle 1600 of FIGS. 16A-16D—may be used to generate sensor data 402 representing objects in a 3D environment around the sensors 401. The sensor data 402 may be pre-processed 404 to form a projection image of a desired size (e.g., spatial dimension). For example, an (accumulated, ego-motion-compensated) LiDAR point cloud may be projected to form a LiDAR range image with a perspective view. The projection image (e.g., the LiDAR range image) and/or other reflection data may be stored and/or encoded into a suitable representation (e.g., input data 406) for the machine learning model(s) 408.

The method 900, at block B904, includes extracting, using one or more Neural Networks (NNs), classification data representing one or more classifications in the first view based at least on the first data. For example, the input data 406 of FIG. 4 may serve as the input into the machine learning model(s) 408, which may include multiple constituent machine learning models or stages chained together that sequentially process different views of a 3D environment. In an example first stage, the encoder/decoder 605 of FIG. 6 may extract classification data (e.g., one or more confidence maps, one or more segmentation masks) in a first view, such as a perspective view, from the input data 406. In the embodiment illustrated in FIG. 6, the class confidence data 610 may represent one or more confidence maps storing pixel values representing a probability, score, or logit that each pixel is part of a corresponding class for each map.

The method 900, at block B906, includes generating transformed classification data representing the one or more classifications in a second view of the environment based at least on projecting the one or more classifications from the first view to the second view. For example, in the embodiment illustrated in FIG. 6, the classification data may correspond to the class confidence data 610 (which may represent one or more confidence maps in a first view, such as a perspective view), and the class confidence data 610 may be transformed 615 into a second view to form transformed class confidence data 630 (e.g., one or more confidence maps in a second view such as a top-down view).

The method 900, at block B908, includes generating, using the one or more NNs, second data representing one or more bounding shapes of one or more objects detected in the environment based at least on the transformed classification data. For example, in the embodiment illustrated in FIG. 6, the transformed classification data may correspond to the transformed class confidence data 630. The transformed class confidence data 630 (e.g., one or more confidence maps in a top-down view) and/or geometry data 640 (e.g., one or more height maps) may be encoded 645 (e.g., stacked into corresponding channels of a tensor) and fed into a second stage of the machine learning model(s) 408, which may comprise an encoder/decoder trunk 650 connected to a class confidence head 655 and an instance regression head 660. The class confidence head 655 and the instance regression head 660 may extract class confidence data 610 (e.g., one or more confidence maps in top-down view) and instance regression data 412 (e.g., object instance data such as location, geometry, and/or orientation), which may be post-processed (e.g., decoded) to generate bounding boxes, closed polylines, or other bounding shapes identifying the locations, sizes, and/or orientations of the detected object instances.

FIG. 10 is a flow diagram showing a method 1000 for perspective and top-down view object detection using LiDAR data, in accordance with some embodiments of the present disclosure. The method 1000, at block B1002, includes receiving LiDAR data from one or more LiDAR sensors in an environment. For example, firmware associated with one or more LiDAR sensor(s) (e.g., sensors 401 of FIG. 4) may be used to control the LiDAR sensor(s) to capture and/or process LiDAR data, such as one or more LiDAR point clouds.

The method 1000, at block B1004, includes generating, from the LiDAR data, first data representing a perspective view of the environment. For example, in embodiments where the sensor data 402 of FIG. 4 includes LiDAR data, the LiDAR data may be accumulated, transformed to a single coordinate system (e.g., centered around an ego-actor/vehicle associated with the LiDAR sensor(s)), ego-motion-compensated (e.g., to a latest known position of the ego-actor/vehicle), and/or projected to form a projection image of a desired size (e.g., spatial dimension). For example, an (accumulated, ego-motion-compensated) LiDAR point cloud may be projected form a LiDAR range image with a perspective view. The projection image (e.g., the LiDAR range image) and/or other reflection data may be stored and/or encoded into a suitable representation (e.g., input data 406) for the machine learning model(s) 408.

The method 1000, at block B1006, includes generating, using one or more Neural Networks (NNs), classification data from the first data, the classification data representing one or more classifications in the perspective view. For example, the input data 406 of FIG. 4 may serve as the input into the machine learning model(s) 408, which may include multiple constituent machine learning models or stages chained together that sequentially process different views of the 3D environment. In an example first stage, the encoder/decoder 605 of FIG. 6 may extract classification data (e.g., one or more confidence maps, one or more segmentation masks) in a first view, such as a perspective view, from the input data 406.

The method 1000, at block B1008, includes generating transformed classification data representing the one or more classifications in a top-down view of the environment by projecting the one or more classifications in the perspective view into the top-down view using the LiDAR data. For example, in the embodiment illustrated in FIG. 6, the classification data may correspond to the class confidence data 610 (which may represent one or more confidence maps in a first view, such as a perspective view). In some cases, classification values represented by the class confidence data 610 may be associated with corresponding 3D locations of LiDAR detections represented by a corresponding range scan pixel in a LiDAR range image to generate labeled 3D locations. The labeled 3D locations may be projected 625 into a second view of the environment, for example, by orthographically projecting the labeled 3D locations to form a projection image with desired spatial dimensions and ground sampling distance (e.g., an overhead image with a top-down view). Each pixel of the resulting projection image where a projected 3D location lands may store the extracted classification data with which the 3D location was labeled (e.g., a classification value or label).

The method 1000, at block B1010, includes generating, using the one or more NNs, second data representing one or more bounding shapes of one or more objects detected in the environment based at least on the transformed classification data in the top-down view. For example, the transformed classification data (e.g., transformed class confidence data 630) and/or the geometry data (e.g., geometry data 640) may be encoded 645 and fed into the second stage of the machine learning model(s) 408 of FIG. 6. The outputs of the second stage (e.g., the class confidence data 410 and the instance regression data 412) may be post-processed (e.g., decoded) to generate bounding boxes, closed polylines, or other bounding shapes identifying the locations, geometry, and/or orientations of the detected object instances.

FIG. 11 is a flow diagram showing a method 1100 for multi-view object detection involving projection of labeled sensor data, in accordance with some embodiments of the present disclosure. The method 1100, at block B1102, includes generating, using one or more neural networks (NNs), classification data representing one or more classifications from image data representing an image of a first view of an environment. For example, the input data 406 of FIG. 4 (e.g., a representation of a LiDAR range image) may serve as the input into the machine learning model(s) 408, which may include multiple constituent machine learning models or stages chained together that sequentially process different views of a 3D environment. In an example first stage, the encoder/decoder 605 of FIG. 6 may extract classification data (e.g., one or more confidence maps, one or more segmentation masks) in a first view, such as a perspective view, from the input data 406.

The method 1100, at block B1104, includes associating the classification data with corresponding three-dimensional (3D) locations identified from corresponding sensor data to generate labeled sensor data. For example, 3D locations from sensor data for a corresponding time slice (e.g., sensor data 402) may be labeled 620 with classification data (e.g., classification values, labels) extracted by the encoder/decoder 605. In some embodiments, a corresponding input LiDAR range image may have a known correspondence between range scan pixels and corresponding points in a LiDAR point cloud (LiDAR detections), which may have known 3D locations. Thus, a classification value from a predicted confidence map, for example, may be associated with a 3D location of a LiDAR detection represented by a corresponding range scan pixel in the input LiDAR range image.

The method 1100, at block B1106, includes projecting the labeled sensor data to a second view of the environment to generate transformed classification data representing the one or more classifications in the second view. For example, labeled 3D locations may be projected 625 into a second view of the environment, for example, by orthographically projecting the labeled 3D locations to form a projection image with desired spatial dimensions and ground sampling distance (e.g., an overhead image with a top-down view). Each pixel of the resulting projection image where a projected 3D location lands may store the extracted classification data with which the 3D location was labeled (e.g., a classification value or label).

The method 1100, at block B1108, includes generating, using the one or more neural networks (NNs), second data representing one or more bounding shapes of one or more objects detected in the environment based at least on the transformed classification data. For example, the transformed classification data (e.g., transformed class confidence data 630) and/or the geometry data (e.g., geometry data 640) may be encoded 645 and fed into the second stage of the machine learning model(s) 408 of FIG. 6. The outputs of the second stage (e.g., the class confidence data 410 and the instance regression data 412) may be post-processed (e.g., decoded) to generate bounding boxes, closed polylines, or other bounding shapes identifying the locations, geometry, and/or orientations of the detected object instances.

Training Machine Learning Model(s) of an Object Detection System

In order to train a machine learning model for an object detection system (e.g., machine learning model(s) 408 of FIG. 4), input training data may be generated from sensor data using the techniques for operating the machine learning model(s) 408 described herein. Ground truth training data may be obtained by annotating data from a plurality of sensors in a sensor setup.

For example, a scene may be observed with LiDAR sensors and one or more cameras (e.g., LiDAR sensor(s) 1664, stereo camera(s) 1668, wide-view camera(s) 1670 (e.g., fisheye cameras), infrared camera(s) 1672, surround camera(s) 1674 (e.g., 360 degree cameras), long-range and/or mid-range camera(s) 1698, etc.) of the autonomous vehicle 1600 of FIGS. 16A-16D) to collect LiDAR data and image data. Since data may be obtained from different sensors at different frequencies, in some embodiments, a particular sensor (e.g., a LiDAR sensor) may be used as a reference sensor. For each frame of sensor data from the reference sensor (e.g., for each frame of LiDAR data), a set of sensor data may be curated by identifying a frame of sensor data from each of the other sensors in the sensor setup that is closest in time to the frame of sensor data from the reference sensor. This set of sensor data (e.g., a frame of LiDAR data at timestamp T plus an image taken closest in time to T from each of a plurality of cameras in the sensor setup) may be referred to as a set of curated sensor data at timestamp T.

Generally, each set of curated sensor data may be used to generate input training data for the machine learning model(s) 408 (e.g., input data 406 and/or geometry data 640 of FIG. 6), as described in more detail above. To generate ground truth training data for each set of curated sensor data, data from each sensor may be annotated and/or labeled independently of data from the other sensors. For example, a frame of LiDAR data may be projected to form a projection image, and the projection image may be annotated with 2D or 3D bounding shapes and supported class labels. Additionally or alternatively, each image (or a composite image formed from constituent images from a set of curated sensor data) may be annotated with 2D or 3D bounding shapes and supported class labels. Annotations may be generated manually and/or automatically, and used to derive corresponding ground truth outputs for the machine learning model(s) 408 (e.g., classification data such as confidence maps or segmentation masks, object instance data, etc.).

Figure 12:
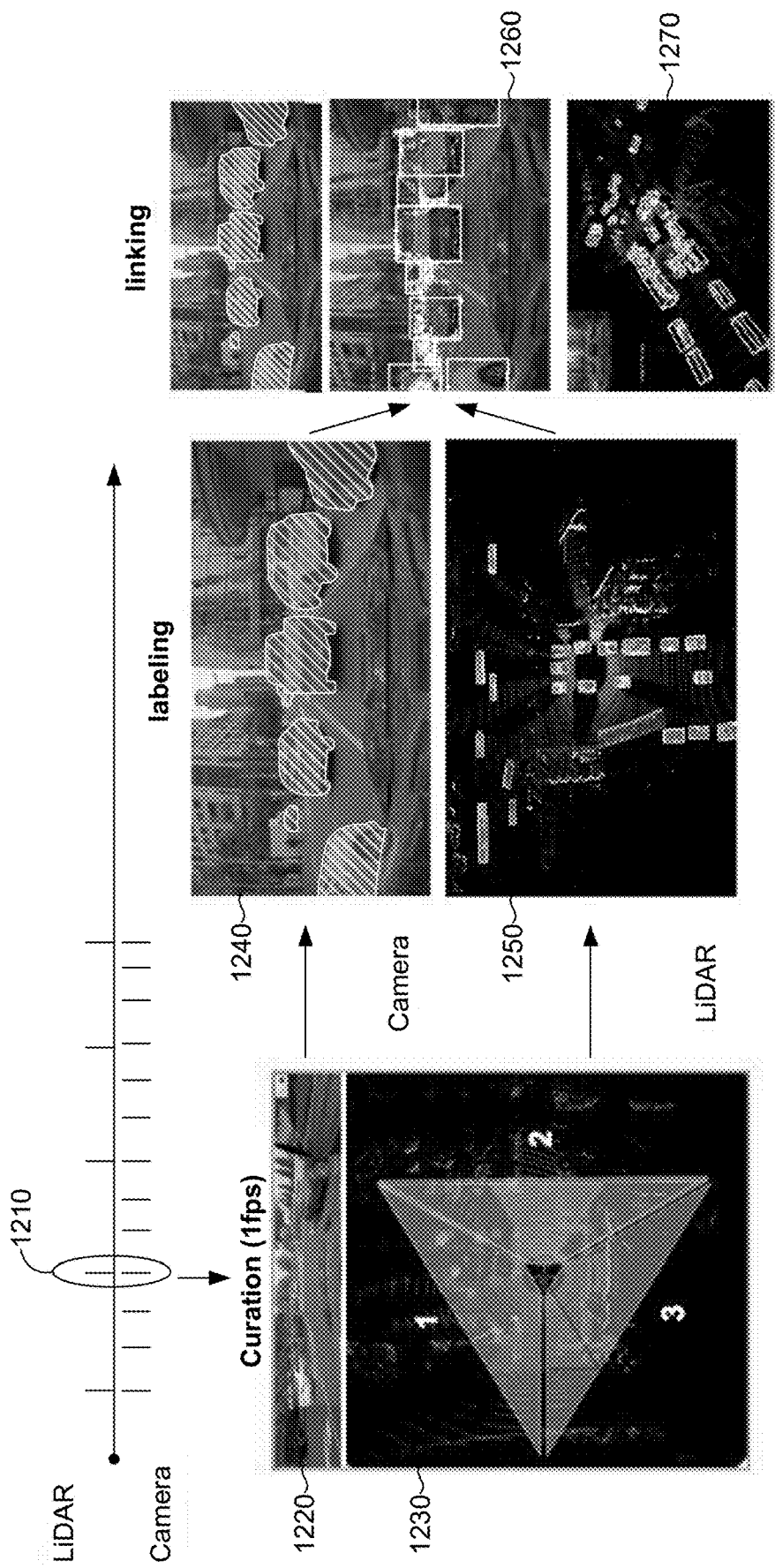
FIG. 12 is an illustration of an example technique for annotating sensor data from different sensors, in accordance with some embodiments of the present disclosure.

FIG. 12 is an illustration of an example technique for annotating sensor data from different sensors, in accordance with some embodiments of the present disclosure. In the example illustrated by FIG. 12, sensor data may be captured from LiDAR sensors and one or more cameras. Generally, sensor data may be captured and curated to produce training data with any desired frequency. The timeline at the top of FIG. 12 illustrates that frames of LiDAR data in this example are generated more frequently than camera images. In this case, LiDAR sensor may be used as a reference sensor, and the camera image captured closest in time to each LiDAR frame may be identified, forming a set of curated sensor data (e.g., the set of curated sensor data 1210). In the example illustrated in FIG. 12, curated sensor data having a frequency of one frame per second may be produced, although a curated sensor data having any desired frequency may be produced.

In FIG. 12, the set of curated sensor data 1210 includes a composite RBG image 1220 and a frame of LiDAR data 1230. The triangle in the frame of LiDAR data 830 indicates a correspondence with three images generated by three different cameras, with the numbered triangle edges indicating the fields of view of the three corresponding camera frusta. In this example, the composite RBG image 1220 is formed by stitching the three different RGB images together. The composite RBG image 1220 and the frame of LiDAR data 1230 may be independently annotated with 2D or 3D bounding shapes and supported class labels. In FIG. 12, the labeled image 1240 and the labeled LiDAR frame 1250 illustrate example annotations (with class labels omitted for simplicity).

Generally, sensor data (e.g., a frame of LiDAR data, an RBG image) may be annotated (e.g., manually, automatically, etc.) with labels or other markers identifying the locations, geometry, orientations, and/or classes of the instances of the relevant objects in the sensor data. The labels may be generated within a 2D or 3D drawing program (e.g., an annotation program), computer aided design (CAD) program, labeling program, another type of suitable program, and/or may be hand drawn, in some examples. In any example, the labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). Generally, the labels may comprise 2D and/or 3D bounding boxes, closed polylines, or other bounding shapes drawn, annotated, superimposed, and/or otherwise associated with the sensor data.

Figure 13:
FIG. 13 is an illustration of example annotations for car and truck classes in camera space, in accordance with some embodiments of the present disclosure.
Figure 14:
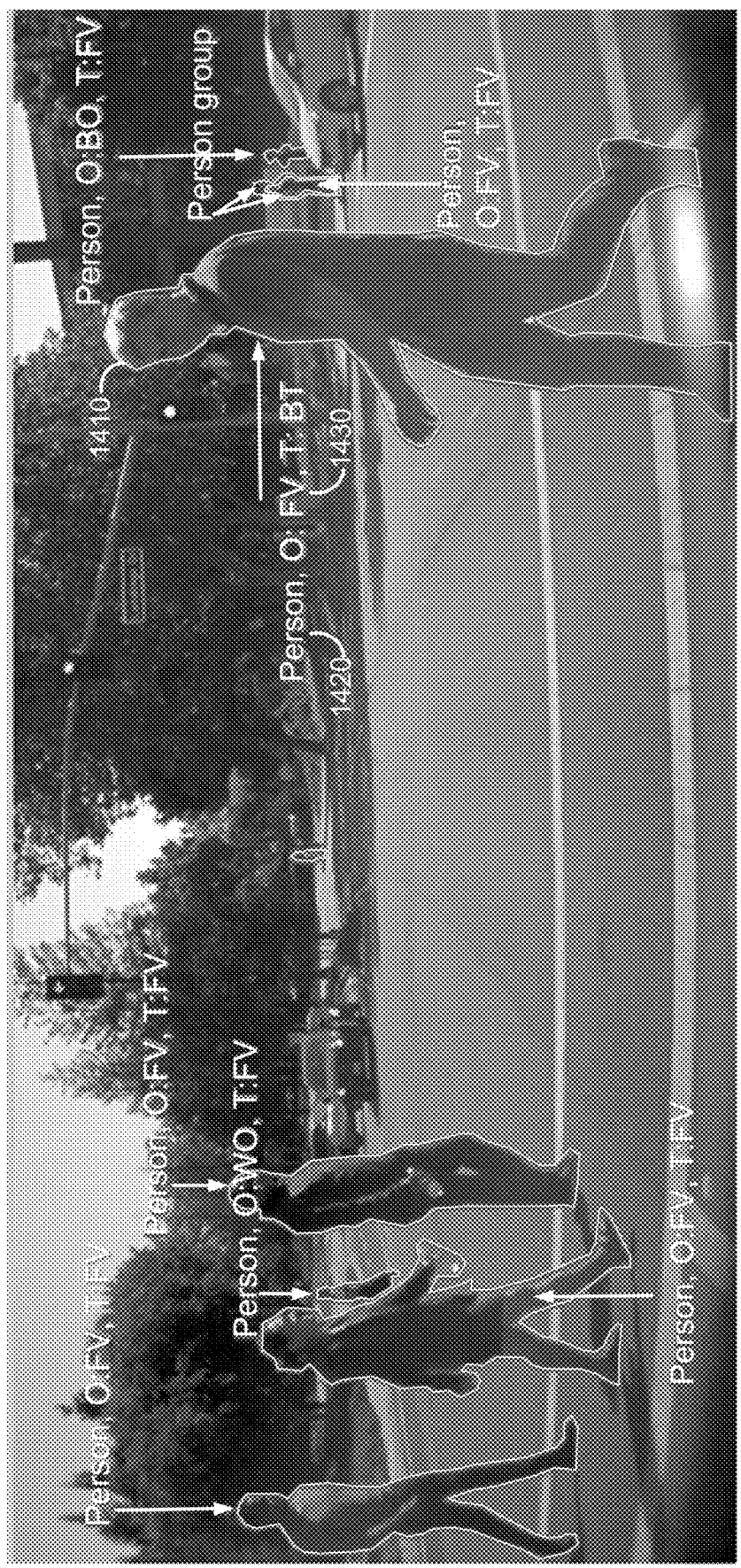
FIG. 14 is an illustration of example annotations for a pedestrian class in camera space, in accordance with some embodiments of the present disclosure.
Figure 15:
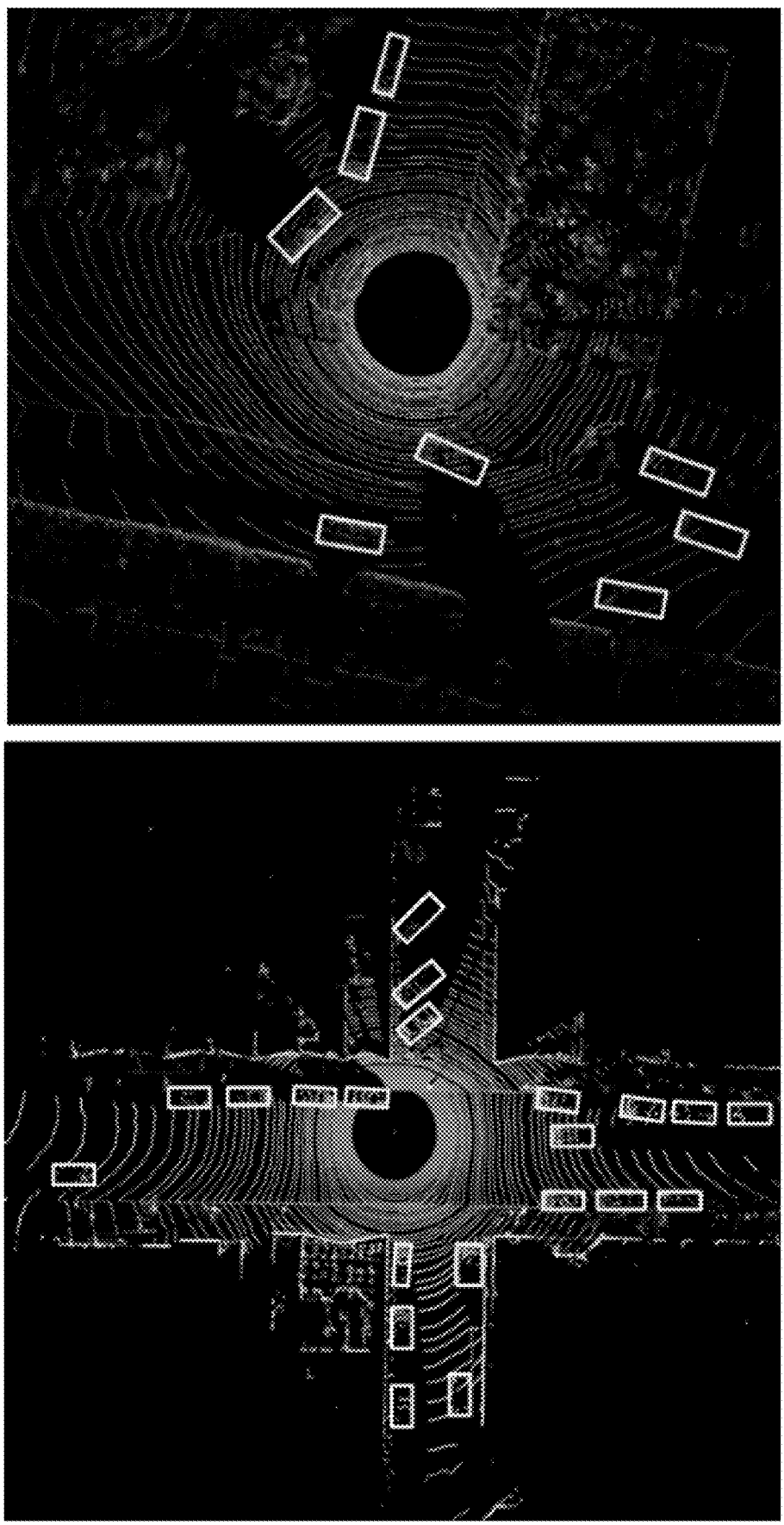
FIG. 15 is an illustration of example annotations for top-down bounding boxes in LiDAR space, in accordance with some embodiments of the present disclosure.

FIG. 13 is an illustration of example annotations for car and truck classes in camera space, in accordance with some embodiments of the present disclosure. For example, a boundary 1310 has been identified around a truck, and the boundary 1310 has been labeled with a corresponding class label 1320 (e.g., truck) and one or more sub-class labels 1330 (e.g., occlusion: front view, truncated: front view). FIG. 14 is an illustration of example annotations for a pedestrian class in camera space, in accordance with some embodiments of the present disclosure. For example, a boundary 1410 has been identified around a pedestrian, and the boundary 1410 has been labeled with a corresponding class label 1420 (e.g., person) and one or more sub-class labels 1430 (e.g., occlusion: front view, truncated: bottom truncated). FIG. 15 is an illustration of example annotations for top-down bounding boxes in LiDAR space, in accordance with some embodiments of the present disclosure. For example, boundaries (e.g., the 2D bounding boxes illustrated in FIG. 15) may be identified around cars and trucks. Each boundary may be labeled with a corresponding class label. Class labels have been omitted from FIG. 15 for simplicity.

In some embodiments, object detection and tracking may be applied to track the movement of annotated objects from frame to frame over time. As such, annotation tracking may be used to track objects from frame to frame (e.g., using persistent identifiers for annotated objects), and tracked annotations may be updated to fine tune annotations in individual frames.

In some embodiments, object tracks and/or detections from sensor data from a particular sensor may be linked to corresponding object tracks and/or detections for the same object from sensor data from a different sensor. Returning to FIG. 12, the third column illustrates an example in which the labeled image 1240 and the labeled LiDAR frame 1250 may be linked. For example, annotations from the different types of sensor data may be projected into a common space (e.g., the annotations from the labeled image 1240 may be projected into the image space of the labeled LiDAR frame 1250, vice versa, the annotations from both the labeled image 1240 and the labeled LiDAR frame 1250 may be projected into some other space, etc.). In the example illustrated in FIG. 12, the annotations from both the labeled image 1240 and the labeled LiDAR frame 1250 may be projected into a 3D space illustrated by the labeled frame 1260. In some embodiments, annotations from the different types of sensor data and/or different class labels may be presented in a manner that illustrates the different classes or sensor data (e.g., presented with different colors, labels, etc.). Corresponding annotations (e.g., overlapping annotations with a threshold IoU) from the different types of sensor data may be linked (e.g., manually and/or automatically). In some embodiments, linked annotations or object tracks from different types of sensor data may be used as inputs to object detection and tracking processes to track the movement of annotated objects from frame to frame over time with improved accuracy.

Additionally or alternatively, linked sensor data may facilitate identifying and/or editing annotations. For example, annotation software may present any combination of views of the sensor data, annotations, and/or labels, and may accept new annotations and/or edits to existing annotations. By way of nonlimiting example, the labeled LiDAR frame 1270 shows the 2D top-down bounding boxes from the labeled LiDAR frame 1250 extended to 3D using 3D software based on the correspondence with the annotations from the labeled image 1240 indicated by the labeled frame 1260. Although the foregoing discussed focused on LiDAR-to-camera linking, any type of sensor data may be linked to any other type of sensor data (including linking between sensor data from two different types of the same sensor, such as camera-to-camera linking). These are meant simply as examples, and other variations may be implemented within the scope of the present disclosure.

Generally, each set of curated sensor data may be used to generate input training data for the machine learning model(s) 408 (e.g., input data 406 and/or geometry data 640 of FIG. 6), and the annotations (e.g., boundaries, enclosed regions, class labels) may be used to generate ground truth data for the machine learning model(s) 408 (e.g., class confidence data 610, class confidence data 410, and instance regression data 412 of FIG. 6). To generate ground truth data from annotations, the location, geometry, orientation, and/or class of each of the annotations may be used to generate a confidence map and/or segmentation mask matching the view, size, and dimensionality of the outputs of the machine learning model(s) 408 (e.g., class confidence data 610 and class confidence data 410). By way of non-limiting example, for a given class and a corresponding dimension of a tensor storing a different confidence map in each channel, pixel values for pixels falling within each labeled bounding shape for that class may be set to a value indicating a positive classification (e.g., 1). The process may be repeated and stored in corresponding channels of a ground truth class confidence tensor. Additionally or alternatively, the location, geometry, orientation, and/or class of each of the annotations may be used to generate object instance data matching the view, size, and dimensionality of the instance regression data 412. For example, for each pixel contained with an annotation, the annotation may be used to compute corresponding location, geometry, and/or orientation information (e.g., where the object is located—such as the object center—relative to each pixel, object height, object width, object orientation (e.g., rotation angles relative to the orientation of the projection image), and/or the like). The computed object instance data may be stored in a corresponding channel of a ground truth instance regression tensor. Thus, annotations may be used to generate ground truth class segmentation and/or instance regression data, which may be used with corresponding input training data (e.g., input images, input tensors) as part of a training dataset to train the machine learning model(s) 408.

In embodiments in which the machine learning model(s) 408 includes a chain of multiple stages, the different stages may be trained together or separately. In some embodiments, the stages may be trained together by implementing a transformation from the output of the first stage (the first view) to the input to the second stage (the second view) (e.g., transform 615 of FIG. 6) using a differentiable operation (e.g., a differentiable re-projection). For example, the training input data may be input into the first stage of the machine learning model(s) 408, the output of the first stage may be transformed 615 using a differentiable transformation, encoded (e.g., with ground truth geometry data 640), and fed into the second stage of the machine learning model(s) 408.

In any event, the ground truth class segmentation and/or instance regression data may be used to train the machine learning model(s) 408. For example, one or more loss functions (e.g., a single loss function, a loss function for each output type, etc.) may be used to compare the accuracy of the output(s) of machine learning model(s) 408 to ground truth, and the parameters of the machine learning model(s) 408 may be updated (e.g., using backward passes, backpropagation, forward passes, etc.) until the accuracy reaches an optimal or acceptable level. In some embodiments in which machine learning model(s) 408 includes multiple heads, the multiple heads may be co-trained together with a common trunk, or may be trained separately. In embodiments involving multi-view scenarios with separate DNN feature extractors, the DNN feature extractors may be co-trained together or separately. These and other variations are contemplated within the present disclosure.

In some embodiments, a classification loss function such as multi-class cross-entropy loss may be used for classification tasks. The multi-class cross-entropy loss may include a pixel-wise cross-entropy loss summed over all classes. For example, classification loss (e.g., for the first and/or the second stage of the machine learning model(s) 408) may be given by $H(p, y) = -\Sigma_i y_i \log(p_i)$, where y is ground truth data (e.g., 1 where a pixel is in the class, 0 otherwise), p is a predicted depth-wise pixel vector with each dimension corresponding to a particular class, p is the predicted classification data per pixel (e.g., probability, score, or logit that the pixel is in a given class i), and the summation may be performed per pixel over all classes (e.g., over all depth channels). Classification loss for a full frame may be computed by computing classification loss for each pixel and taking its mean value.

In some embodiments, a regression loss function such as L1 or L2 loss may be used for regression tasks. For example, regression loss (e.g., for the second stage of the machine learning model(s) 408) may be given by $R(v, t) = |v-t|$, where v is a predicted depth-wise pixel vector to regress, t is a target/ground truth depth-wise pixel vector, and per-pixel regression loss may be summed over all depth channels. In some embodiments, regression loss may be used only for those pixels that belong to a corresponding classification mask (e.g., predicted by the class confidence head 655 of FIG. 6, or derived therefrom). Thus, for each pixel (in the mask), regression loss may be summed over each depth channel, and the mean may be computed over all object pixels, for example, by normalizing (e.g., dividing) by the number of pixels that fall into object masks (e.g., for all classes).

In some embodiments, a total loss may be computed as a sum of classification loss (e.g., from the first and/or the second stage of the machine learning model(s) 408) and regression loss (e.g., from the second stage of the machine learning model(s) 408). In some embodiments, the contribution to the loss from the different tasks may be weighted with fixed weights and/or autoweights. Additionally or alternatively, classification loss may be weighted to counteract a class imbalance present in a training dataset. These and other variations may be implemented within the scope of the present disclosure.

Example Autonomous Vehicle

FIG. 16A is an illustration of an example autonomous vehicle 1600, in accordance with some embodiments of the present disclosure. The autonomous vehicle 1600 (alternatively referred to herein as the "vehicle 1600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1600 may be capable of functionality in accordance with one or more of Level 3-Level 5 of the autonomous driving levels. For example, the vehicle 1600 may be capable of conditional automation (Level 3), high automation (Level 4), and/or full automation (Level 5), depending on the embodiment.

The vehicle 1600 may include components such as a chassis, a vehicle body, wheels (e.g., 2, 4, 6, 8, 18, etc.), tires, axles, and other components of a vehicle. The vehicle 1600 may include a propulsion system 1650, such as an internal combustion engine, hybrid electric power plant, an all-electric engine, and/or another propulsion system type. The propulsion system 1650 may be connected to a drive train of the vehicle 1600, which may include a transmission, to enable the propulsion of the vehicle 1600. The propulsion system 1650 may be controlled in response to receiving signals from the throttle/accelerator 1652.

A steering system 1654, which may include a steering wheel, may be used to steer the vehicle 1600 (e.g., along a desired path or route) when the propulsion system 1650 is operating (e.g., when the vehicle is in motion). The steering system 1654 may receive signals from a steering actuator 1656. The steering wheel may be optional for full automation (Level 5) functionality.

The brake sensor system 1646 may be used to operate the vehicle brakes in response to receiving signals from the brake actuators 1648 and/or brake sensors.

Controller(s) 1636, which may include one or more system on chips (SoCs) 1604 (FIG. 16C) and/or GPU(s), may provide signals (e.g., representative of commands) to one or more components and/or systems of the vehicle 1600. For example, the controller(s) may send signals to operate the vehicle brakes via one or more brake actuators 1648, to operate the steering system 1654 via one or more steering actuators 1656, to operate the propulsion system 1650 via one or more throttle/accelerators 1652. The controller(s) 1636 may include one or more onboard (e.g., integrated) computing devices (e.g., supercomputers) that process sensor signals, and output operation commands (e.g., signals representing commands) to enable autonomous driving and/or to assist a human driver in driving the vehicle 1600. The controller(s) 1636 may include a first controller 1636 for autonomous driving functions, a second controller 1636 for functional safety functions, a third controller 1636 for artificial intelligence functionality (e.g., computer vision), a fourth controller 1636 for infotainment functionality, a fifth controller 1636 for redundancy in emergency conditions, and/or other controllers. In some examples, a single controller 1636 may handle two or more of the above functionalities, two or more controllers 1636 may handle a single functionality, and/or any combination thereof.

The controller(s) 1636 may provide the signals for controlling one or more components and/or systems of the vehicle 1600 in response to sensor data received from one or more sensors (e.g., sensor inputs). The sensor data may be received from, for example and without limitation, global navigation satellite systems sensor(s) 1658 (e.g., Global Positioning System sensor(s)), RADAR sensor(s) 1660, ultrasonic sensor(s) 1662, LiDAR sensor(s) 1664, inertial measurement unit (IMU) sensor(s) 1666 (e.g., accelerometer(s), gyroscope(s), magnetic compass(es), magnetometer(s), etc.), microphone(s) 1696, stereo camera(s) 1668, wide-view camera(s) 1670 (e.g., fisheye cameras), infrared camera(s) 1672, surround camera(s) 1674 (e.g., 360 degree cameras), long-range and/or mid-range camera(s) 1698, speed sensor(s) 1644 (e.g., for measuring the speed of the vehicle 1600), vibration sensor(s) 1642, steering sensor(s) 1640, brake sensor(s) (e.g., as part of the brake sensor system 1646), and/or other sensor types.

One or more of the controller(s) 1636 may receive inputs (e.g., represented by input data) from an instrument cluster 1632 of the vehicle 1600 and provide outputs (e.g., represented by output data, display data, etc.) via a human-machine interface (HMI) display 1634, an audible annunciator, a loudspeaker, and/or via other components of the vehicle 1600. The outputs may include information such as vehicle velocity, speed, time, map data (e.g., the HD map 1622 of FIG. 16C), location data (e.g., the vehicle's 1600 location, such as on a map), direction, location of other vehicles (e.g., an occupancy grid), information about objects and status of objects as perceived by the controller(s) 1636, etc. For example, the HMI display 1634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1600 further includes a network interface 1624 which may use one or more wireless antenna(s) 1626 and/or modem(s) to communicate over one or more networks. For example, the network interface 1624 may be capable of communication over LTE, WCDMA, UMTS, GSM, CDMA2000, etc. The wireless antenna(s) 1626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

FIG. 16B is an example of camera locations and fields of view for the example autonomous vehicle 1600 of FIG. 16A, in accordance with some embodiments of the present disclosure. The cameras and respective fields of view are one example embodiment and are not intended to be limiting. For example, additional and/or alternative cameras may be included and/or the cameras may be located at different locations on the vehicle 1600.

The camera types for the cameras may include, but are not limited to, digital cameras that may be adapted for use with the components and/or systems of the vehicle 1600. The camera(s) may operate at automotive safety integrity level (ASIL) B and/or at another ASIL. The camera types may be capable of any image capture rate, such as 60 frames per second (fps), 1620 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1600 (e.g., front-facing cameras) may be used for surround view, to help identify forward facing paths and obstacles, as well aid in, with the help of one or more controllers 1636 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1670 that may be used to perceive objects coming into view from the periphery (e.g., pedestrians, crossing traffic or bicycles). Although only one wide-view camera is illustrated in FIG. 16B, there may any number of wide-view cameras 1670 on the vehicle 1600. In addition, long-range camera(s) 1698 (e.g., a long-view stereo camera pair) may be used for depth-based object detection, especially for objects for which a neural network has not yet been trained. The long-range camera(s) 1698 may also be used for object detection and classification, as well as basic object tracking.

One or more stereo cameras 1668 may also be included in a front-facing configuration. The stereo camera(s) 1668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1668 may be used in addition to, or alternatively from, those described herein.

Cameras with a field of view that include portions of the environment to the side of the vehicle 1600 (e.g., side-view cameras) may be used for surround view, providing information used to create and update the occupancy grid, as well as to generate side impact collision warnings. For example, surround camera(s) 1674 (e.g., four surround cameras 1674 as illustrated in FIG. 16B) may be positioned to on the vehicle 1600. The surround camera(s) 1674 may include wide-view camera(s) 1670, fisheye camera(s), 360 degree camera(s), and/or the like. Four example, four fisheye cameras may be positioned on the vehicle's front, rear, and sides. In an alternative arrangement, the vehicle may use three surround camera(s) 1674 (e.g., left, right, and rear), and may leverage one or more other camera(s) (e.g., a forward-facing camera) as a fourth surround view camera.

Cameras with a field of view that include portions of the environment to the rear of the vehicle 1600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1698, stereo camera(s) 1668), infrared camera(s) 1672, etc.), as described herein.

FIG. 16C is a block diagram of an example system architecture for the example autonomous vehicle 1600 of FIG. 16A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1600 in FIG. 16C are illustrated as being connected via bus 1602. The bus 1602 may include a Controller Area Network (CAN) data interface (alternatively referred to herein as a "CAN bus"). A CAN may be a network inside the vehicle 1600 used to aid in control of various features and functionality of the vehicle 1600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1602 is described herein as being a CAN bus, this is not intended to be limiting. For example, in addition to, or alternatively from, the CAN bus, FlexRay and/or Ethernet may be used. Additionally, although a single line is used to represent the bus 1602, this is not intended to be limiting. For example, there may be any number of busses 1602, which may include one or more CAN busses, one or more FlexRay busses, one or more Ethernet busses, and/or one or more other types of busses using a different protocol. In some examples, two or more busses 1602 may be used to perform different functions, and/or may be used for redundancy. For example, a first bus 1602 may be used for collision avoidance functionality and a second bus 1602 may be used for actuation control. In any example, each bus 1602 may communicate with any of the components of the vehicle 1600, and two or more busses 1602 may communicate with the same components. In some examples, each SoC 1604, each controller 1636, and/or each computer within the vehicle may have access to the same input data (e.g., inputs from sensors of the vehicle 1600), and may be connected to a common bus, such the CAN bus.

The vehicle 1600 may include one or more controller(s) 1636, such as those described herein with respect to FIG. 16A. The controller(s) 1636 may be used for a variety of functions. The controller(s) 1636 may be coupled to any of the various other components and systems of the vehicle 1600, and may be used for control of the vehicle 1600, artificial intelligence of the vehicle 1600, infotainment for the vehicle 1600, and/or the like.

The vehicle 1600 may include a system(s) on a chip (SoC) 1604. The SoC 1604 may include CPU(s) 1606, GPU(s) 1608, processor(s) 1610, cache(s) 1612, accelerator(s) 1614, data store(s) 1616, and/or other components and features not illustrated. The SoC(s) 1604 may be used to control the vehicle 1600 in a variety of platforms and systems. For example, the SoC(s) 1604 may be combined in a system (e.g., the system of the vehicle 1600) with an HD map 1622 which may obtain map refreshes and/or updates via a network interface 1624 from one or more servers (e.g., server(s) 1678 of FIG. 16D).

The CPU(s) 1606 may include a CPU cluster or CPU complex (alternatively referred to herein as a "CCPLEX"). The CPU(s) 1606 may include multiple cores and/or L2 caches. For example, in some embodiments, the CPU(s) 1606 may include eight cores in a coherent multi-processor configuration. In some embodiments, the CPU(s) 1606 may include four dual-core clusters where each cluster has a dedicated L2 cache (e.g., a 2 MB L2 cache). The CPU(s) 1606 (e.g., the CCPLEX) may be configured to support simultaneous cluster operation enabling any combination of the clusters of the CPU(s) 1606 to be active at any given time.

The CPU(s) 1606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1608 may include an integrated GPU (alternatively referred to herein as an "iGPU"). The GPU(s) 1608 may be programmable and may be efficient for parallel workloads. The GPU(s) 1608, in some examples, may use an enhanced tensor instruction set. The GPU(s) 1608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1608 may include at least eight streaming microprocessors. The GPU(s) 1608 may use compute application programming interface(s) (API(s)). In addition, the GPU(s) 1608 may use one or more parallel computing platforms and/or programming models (e.g., NVIDIA's CUDA).

The GPU(s) 1608 may be power-optimized for best performance in automotive and embedded use cases. For example, the GPU(s) 1608 may be fabricated on a Fin field-effect transistor (FinFET). However, this is not intended to be limiting and the GPU(s) 1608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1608 to access the CPU(s) 1606 page tables directly. In such examples, when the GPU(s) 1608 memory management unit (MMU) experiences a miss, an address translation request may be transmitted to the CPU(s) 1606. In response, the CPU(s) 1606 may look in its page tables for the virtual-to-physical mapping for the address and transmits the translation back to the GPU(s) 1608. As such, unified memory technology may allow a single unified virtual address space for memory of both the CPU(s) 1606 and the GPU(s) 1608, thereby simplifying the GPU(s) 1608 programming and porting of applications to the GPU(s) 1608.

In addition, the GPU(s) 1608 may include an access counter that may keep track of the frequency of access of the GPU(s) 1608 to memory of other processors. The access counter may help ensure that memory pages are moved to the physical memory of the processor that is accessing the pages most frequently.

The SoC(s) 1604 may include any number of cache(s) 1612, including those described herein. For example, the cache(s) 1612 may include an L3 cache that is available to both the CPU(s) 1606 and the GPU(s) 1608 (e.g., that is connected both the CPU(s) 1606 and the GPU(s) 1608). The cache(s) 1612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1604 may include an arithmetic logic unit(s) (ALU(s)) which may be leveraged in performing processing with respect to any of the variety of tasks or operations of the vehicle 1600—such as processing DNNs. In addition, the SoC(s) 1604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1606 and/or GPU(s) 1608.

The SoC(s) 1604 may include one or more accelerators 1614 (e.g., hardware accelerators, software accelerators, or a combination thereof). For example, the SoC(s) 1604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1608 and to off-load some of the tasks of the GPU(s) 1608 (e.g., to free up more cycles of the GPU(s) 1608 for performing other tasks). As an example, the accelerator(s) 1614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1608, and by using an inference accelerator, for example, a designer may target either the DLA(s) or the GPU(s) 1608 for any function. For example, the designer may focus processing of CNNs and floating point operations on the DLA(s) and leave other functions to the GPU(s) 1608 and/or other accelerator(s) 1614.

The accelerator(s) 1614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1614 (e.g., the hardware acceleration cluster) may include a computer vision network on-chip and SRAM, for providing a high-bandwidth, low latency SRAM for the accelerator(s) 1614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1666 output that correlates with the vehicle 1600 orientation, distance, 3D location estimates of the object obtained from the neural network and/or other sensors (e.g., LiDAR sensor(s) 1664 or RADAR sensor(s) 1660), among others.

The SoC(s) 1604 may include data store(s) 1616 (e.g., memory). The data store(s) 1616 may be on-chip memory of the SoC(s) 1604, which may store neural networks to be executed on the GPU and/or the DLA. In some examples, the data store(s) 1616 may be large enough in capacity to store multiple instances of neural networks for redundancy and safety. The data store(s) 1612 may comprise L2 or L3 cache(s) 1612. Reference to the data store(s) 1616 may include reference to the memory associated with the PVA, DLA, and/or other accelerator(s) 1614, as described herein.

The SoC(s) 1604 may include one or more processor(s) 1610 (e.g., embedded processors). The processor(s) 1610 may include a boot and power management processor that may be a dedicated processor and subsystem to handle boot power and management functions and related security enforcement. The boot and power management processor may be a part of the SoC(s) 1604 boot sequence and may provide runtime power management services. The boot power and management processor may provide clock and voltage programming, assistance in system low power state transitions, management of SoC(s) 1604 thermals and temperature sensors, and/or management of the SoC(s) 1604 power states. Each temperature sensor may be implemented as a ring-oscillator whose output frequency is proportional to temperature, and the SoC(s) 1604 may use the ring-oscillators to detect temperatures of the CPU(s) 1606, GPU(s) 1608, and/or accelerator(s) 1614. If temperatures are determined to exceed a threshold, the boot and power management processor may enter a temperature fault routine and put the SoC(s) 1604 into a lower power state and/or put the vehicle 1600 into a chauffeur to safe stop mode (e.g., bring the vehicle 1600 to a safe stop).

The processor(s) 1610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1610 may further include a real-time camera engine that may include a dedicated processor subsystem for handling real-time camera management.

The processor(s) 1610 may further include a high-dynamic range signal processor that may include an image signal processor that is a hardware engine that is part of the camera processing pipeline.

The processor(s) 1610 may include a video image compositor that may be a processing block (e.g., implemented on a microprocessor) that implements video post-processing functions needed by a video playback application to produce the final image for the player window. The video image compositor may perform lens distortion correction on wide-view camera(s) 1670, surround camera(s) 1674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1608 is not required to continuously render new surfaces. Even when the GPU(s) 1608 is powered on and active doing 3D rendering, the video image compositor may be used to offload the GPU(s) 1608 to improve performance and responsiveness.

The SoC(s) 1604 may further include a mobile industry processor interface (MIPI) camera serial interface for receiving video and input from cameras, a high-speed interface, and/or a video input block that may be used for camera and related pixel input functions. The SoC(s) 1604 may further include an input/output controller(s) that may be controlled by software and may be used for receiving I/O signals that are uncommitted to a specific role.

The SoC(s) 1604 may further include a broad range of peripheral interfaces to enable communication with peripherals, audio codecs, power management, and/or other devices. The SoC(s) 1604 may be used to process data from cameras (e.g., connected over Gigabit Multimedia Serial Link and Ethernet), sensors (e.g., LiDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus). The SoC(s) 1604 may further include dedicated high-performance mass storage controllers that may include their own DMA engines, and that may be used to free the CPU(s) 1606 from routine data management tasks.

The SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1604 may be faster, more reliable, and even more energy-efficient and space-efficient than conventional systems. For example, the accelerator(s) 1614, when combined with the CPU(s) 1606, the GPU(s) 1608, and the data store(s) 1616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1608.

In some examples, a CNN for facial recognition and vehicle owner identification may use data from camera sensors to identify the presence of an authorized driver and/or owner of the vehicle 1600. The always on sensor processing engine may be used to unlock the vehicle when the owner approaches the driver door and turn on the lights, and, in security mode, to disable the vehicle when the owner leaves the vehicle. In this way, the SoC(s) 1604 provide for security against theft and/or carjacking.

In another example, a CNN for emergency vehicle detection and identification may use data from microphones 1696 to detect and identify emergency vehicle sirens. In contrast to conventional systems, that use general classifiers to detect sirens and manually extract features, the SoC(s) 1604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1662, until the emergency vehicle(s) passes.

The vehicle may include a CPU(s) 1618 (e.g., discrete CPU(s), or dCPU(s)), that may be coupled to the SoC(s) 1604 via a high-speed interconnect (e.g., PCIe). The CPU(s) 1618 may include an X86 processor, for example. The CPU(s) 1618 may be used to perform any of a variety of functions, including arbitrating potentially inconsistent results between ADAS sensors and the SoC(s) 1604, and/or monitoring the status and health of the controller(s) 1636 and/or infotainment SoC 1630, for example.

The vehicle 1600 may include a GPU(s) 1620 (e.g., discrete GPU(s), or dGPU(s)), that may be coupled to the SoC(s) 1604 via a high-speed interconnect (e.g., NVIDIA's NVLINK). The GPU(s) 1620 may provide additional artificial intelligence functionality, such as by executing redundant and/or different neural networks, and may be used to train and/or update neural networks based on input (e.g., sensor data) from sensors of the vehicle 1600.

The vehicle 1600 may further include the network interface 1624 which may include one or more wireless antennas 1626 (e.g., one or more wireless antennas for different communication protocols, such as a cellular antenna, a Bluetooth antenna, etc.). The network interface 1624 may be used to enable wireless connectivity over the Internet with the cloud (e.g., with the server(s) 1678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1600 information about vehicles in proximity to the vehicle 1600 (e.g., vehicles in front of, on the side of, and/or behind the vehicle 1600). This functionality may be part of a cooperative adaptive cruise control functionality of the vehicle 1600.

The network interface 1624 may include a SoC that provides modulation and demodulation functionality and enables the controller(s) 1636 to communicate over wireless networks. The network interface 1624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1600 may further include data store(s) 1628 which may include off-chip (e.g., off the SoC(s) 1604) storage. The data store(s) 1628 may include one or more storage elements including RAM, SRAM, DRAM, VRAM, Flash, hard disks, and/or other components and/or devices that may store at least one bit of data.

The vehicle 1600 may further include GNSS sensor(s) 1658. The GNSS sensor(s) 1658 (e.g., GPS, assisted GPS sensors, differential GPS (DGPS) sensors, etc.), to assist in mapping, perception, occupancy grid generation, and/or path planning functions. Any number of GNSS sensor(s) 1658 may be used, including, for example and without limitation, a GPS using a USB connector with an Ethernet to Serial (RS-232) bridge.

The vehicle 1600 may further include RADAR sensor(s) 1660. The RADAR sensor(s) 1660 may be used by the vehicle 1600 for long-range vehicle detection, even in darkness and/or severe weather conditions. RADAR functional safety levels may be ASIL B. The RADAR sensor(s) 1660 may use the CAN and/or the bus 1602 (e.g., to transmit data generated by the RADAR sensor(s) 1660) for control and to access object tracking data, with access to Ethernet to access raw data in some examples. A wide variety of RADAR sensor types may be used. For example, and without limitation, the RADAR sensor(s) 1660 may be suitable for front, rear, and side RADAR use. In some example, Pulse Doppler RADAR sensor(s) are used.

The RADAR sensor(s) 1660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1600 surroundings at higher speeds with minimal interference from traffic in adjacent lanes. The other two antennae may expand the field of view, making it possible to quickly detect vehicles entering or leaving the vehicle's 1600 lane.

Mid-range RADAR systems may include, as an example, a range of up to 1660 m (front) or 80 m (rear), and a field of view of up to 42 degrees (front) or 1650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1600 may further include ultrasonic sensor(s) 1662. The ultrasonic sensor(s) 1662, which may be positioned at the front, back, and/or the sides of the vehicle 1600, may be used for park assist and/or to create and update an occupancy grid. A wide variety of ultrasonic sensor(s) 1662 may be used, and different ultrasonic sensor(s) 1662 may be used for different ranges of detection (e.g., 2.5 m, 4 m). The ultrasonic sensor(s) 1662 may operate at functional safety levels of ASIL B.

The vehicle 1600 may include LiDAR sensor(s) 1664. The LiDAR sensor(s) 1664 may be used for object and pedestrian detection, emergency braking, collision avoidance, and/or other functions. The LiDAR sensor(s) 1664 may be functional safety level ASIL B. In some examples, the vehicle 1600 may include multiple LiDAR sensors 1664 (e.g., two, four, six, etc.) that may use Ethernet (e.g., to provide data to a Gigabit Ethernet switch).

In some examples, the LiDAR sensor(s) 1664 may be capable of providing a list of objects and their distances for a 360-degree field of view. Commercially available LiDAR sensor(s) 1664 may have an advertised range of approximately 1600 m, with an accuracy of 2 cm-3 cm, and with support for a 1600 Mbps Ethernet connection, for example. In some examples, one or more non-protruding LiDAR sensors 1664 may be used. In such examples, the LiDAR sensor(s) 1664 may be implemented as a small device that may be embedded into the front, rear, sides, and/or corners of the vehicle 1600. The LiDAR sensor(s) 1664, in such examples, may provide up to a 120-degree horizontal and 35-degree vertical field-of-view, with a 200 m range even for low-reflectivity objects. Front-mounted LiDAR sensor(s) 1664 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1600. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1664 may be less susceptible to motion blur, vibration, and/or shock.

The vehicle may further include IMU sensor(s) 1666. The IMU sensor(s) 1666 may be located at a center of the rear axle of the vehicle 1600, in some examples. The IMU sensor(s) 1666 may include, for example and without limitation, an accelerometer(s), a magnetometer(s), a gyroscope(s), a magnetic compass(es), and/or other sensor types. In some examples, such as in six-axis applications, the IMU sensor(s) 1666 may include accelerometers and gyroscopes, while in nine-axis applications, the IMU sensor(s) 1666 may include accelerometers, gyroscopes, and magnetometers.

In some embodiments, the IMU sensor(s) 1666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1666 may enable the vehicle 1600 to estimate heading without requiring input from a magnetic sensor by directly observing and correlating the changes in velocity from GPS to the IMU sensor(s) 1666. In some examples, the IMU sensor(s) 1666 and the GNSS sensor(s) 1658 may be combined in a single integrated unit.

The vehicle may include microphone(s) 1696 placed in and/or around the vehicle 1600. The microphone(s) 1696 may be used for emergency vehicle detection and identification, among other things.

The vehicle may further include any number of camera types, including stereo camera(s) 1668, wide-view camera(s) 1670, infrared camera(s) 1672, surround camera(s) 1674, long-range and/or mid-range camera(s) 1698, and/or other camera types. The cameras may be used to capture image data around an entire periphery of the vehicle 1600. The types of cameras used depends on the embodiments and requirements for the vehicle 1600, and any combination of camera types may be used to provide the necessary coverage around the vehicle 1600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera (s) is described with more detail herein with respect to FIG. 16A and FIG. 16B.

The vehicle 1600 may further include vibration sensor(s) 1642. The vibration sensor(s) 1642 may measure vibrations of components of the vehicle, such as the axle(s). For example, changes in vibrations may indicate a change in road surfaces. In another example, when two or more vibration sensors 1642 are used, the differences between the vibrations may be used to determine friction or slippage of the road surface (e.g., when the difference in vibration is between a power-driven axle and a freely rotating axle).

The vehicle 1600 may include an ADAS system 1638. The ADAS system 1638 may include a SoC, in some examples. The ADAS system 1638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1660, LiDAR sensor(s) 1664, and/or a camera(s). The ACC systems may include longitudinal ACC and/or lateral ACC. Longitudinal ACC monitors and controls the distance to the vehicle immediately ahead of the vehicle 1600 and automatically adjust the vehicle speed to maintain a safe distance from vehicles ahead. Lateral ACC performs distance keeping, and advises the vehicle 1600 to change lanes when necessary. Lateral ACC is related to other ADAS applications such as LCA and CWS.

CACC uses information from other vehicles that may be received via the network interface 1624 and/or the wireless antenna(s) 1626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1600), while the I2V communication concept provides information about traffic further ahead. CACC systems may include either or both I2V and V2V information sources. Given the information of the vehicles ahead of the vehicle 1600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1600 if the vehicle 1600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1600 is backing up. Some RCTW systems include AEB to ensure that the vehicle brakes are applied to avoid a crash. RCTW systems may use one or more rear-facing RADAR sensor(s) 1660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1600, the vehicle 1600 itself must, in the case of conflicting results, decide whether to heed the result from a primary computer or a secondary computer (e.g., a first controller 1636 or a second controller 1636). For example, in some embodiments, the ADAS system 1638 may be a backup and/or secondary computer for providing perception information to a backup computer rationality module. The backup computer rationality monitor may run a redundant diverse software on hardware components to detect faults in perception and dynamic driving tasks. Outputs from the ADAS system 1638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1604.

In other examples, ADAS system 1638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1638 may be fed into the primary computer's perception block and/or the primary computer's dynamic driving task block. For example, if the ADAS system 1638 indicates a forward crash warning due to an object immediately ahead, the perception block may use this information when identifying objects. In other examples, the secondary computer may have its own neural network which is trained and thus reduces the risk of false positives, as described herein.

The vehicle 1600 may further include the infotainment SoC 1630 (e.g., an in-vehicle infotainment system (IVI)). Although illustrated and described as a SoC, the infotainment system may not be a SoC, and may include two or more discrete components. The infotainment SoC 1630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1600. For example, the infotainment SoC 1630 may radios, disk players, navigation systems, video players, USB and Bluetooth connectivity, carputers, in-car entertainment, Wi-Fi, steering wheel audio controls, hands free voice control, a heads-up display (HUD), an HMI display 1634, a telematics device, a control panel (e.g., for controlling and/or interacting with various components, features, and/or systems), and/or other components. The infotainment SoC 1630 may further be used to provide information (e.g., visual and/or audible) to a user(s) of the vehicle, such as information from the ADAS system 1638, autonomous driving information such as planned vehicle maneuvers, trajectories, surrounding environment information (e.g., intersection information, vehicle information, road information, etc.), and/or other information.

The infotainment SoC 1630 may include GPU functionality. The infotainment SoC 1630 may communicate over the bus 1602 (e.g., CAN bus, Ethernet, etc.) with other devices, systems, and/or components of the vehicle 1600. In some examples, the infotainment SoC 1630 may be coupled to a supervisory MCU such that the GPU of the infotainment system may perform some self-driving functions in the event that the primary controller(s) 1636 (e.g., the primary and/or backup computers of the vehicle 1600) fail. In such an example, the infotainment SoC 1630 may put the vehicle 1600 into a chauffeur to safe stop mode, as described herein.

The vehicle 1600 may further include an instrument cluster 1632 (e.g., a digital dash, an electronic instrument cluster, a digital instrument panel, etc.). The instrument cluster 1632 may include a controller and/or supercomputer (e.g., a discrete controller or supercomputer). The instrument cluster 1632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1630 and the instrument cluster 1632. In other words, the instrument cluster 1632 may be included as part of the infotainment SoC 1630, or vice versa.

FIG. 16D is a system diagram for communication between cloud-based server(s) and the example autonomous vehicle 1600 of FIG. 16A, in accordance with some embodiments of the present disclosure. The system 1676 may include server(s) 1678, network(s) 1690, and vehicles, including the vehicle 1600. The server(s) 1678 may include a plurality of GPUs 1684(A)-1684(H) (collectively referred to herein as GPUs 1684), PCIe switches 1682(A)-1682(H) (collectively referred to herein as PCIe switches 1682), and/or CPUs 1680(A)-1680(B) (collectively referred to herein as CPUs 1680). The GPUs 1684, the CPUs 1680, and the PCIe switches may be interconnected with high-speed interconnects such as, for example and without limitation, NVLink interfaces 1688 developed by NVIDIA and/or PCIe connections 1686. In some examples, the GPUs 1684 are connected via NVLink and/or NVSwitch SoC and the GPUs 1684 and the PCIe switches 1682 are connected via PCIe interconnects. Although eight GPUs 1684, two CPUs 1680, and two PCIe switches are illustrated, this is not intended to be limiting. Depending on the embodiment, each of the server(s) 1678 may include any number of GPUs 1684, CPUs 1680, and/or PCIe switches. For example, the server(s) 1678 may each include eight, sixteen, thirty-two, and/or more GPUs 1684.

The server(s) 1678 may receive, over the network(s) 1690 and from the vehicles, image data representative of images showing unexpected or changed road conditions, such as recently commenced road-work. The server(s) 1678 may transmit, over the network(s) 1690 and to the vehicles, neural networks 1692, updated neural networks 1692, and/or map information 1694, including information regarding traffic and road conditions. The updates to the map information 1694 may include updates for the HD map 1622, such as information regarding construction sites, potholes, detours, flooding, and/or other obstructions. In some examples, the neural networks 1692, the updated neural networks 1692, and/or the map information 1694 may have resulted from new training and/or experiences represented in data received from any number of vehicles in the environment, and/or based on training performed at a datacenter (e.g., using the server(s) 1678 and/or other servers).

The server(s) 1678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1690, and/or the machine learning models may be used by the server(s) 1678 to remotely monitor the vehicles.

In some examples, the server(s) 1678 may receive data from the vehicles and apply the data to up-to-date real-time neural networks for real-time intelligent inferencing. The server(s) 1678 may include deep-learning supercomputers and/or dedicated AI computers powered by GPU(s) 1684, such as a DGX and DGX Station machines developed by NVIDIA. However, in some examples, the server(s) 1678 may include deep learning infrastructure that use only CPU-powered datacenters.

The deep-learning infrastructure of the server(s) 1678 may be capable of fast, real-time inferencing, and may use that capability to evaluate and verify the health of the processors, software, and/or associated hardware in the vehicle 1600. For example, the deep-learning infrastructure may receive periodic updates from the vehicle 1600, such as a sequence of images and/or objects that the vehicle 1600 has located in that sequence of images (e.g., via computer vision and/or other machine learning object classification techniques). The deep-learning infrastructure may run its own neural network to identify the objects and compare them with the objects identified by the vehicle 1600 and, if the results do not match and the infrastructure concludes that the AI in the vehicle 1600 is malfunctioning, the server(s) 1678 may transmit a signal to the vehicle 1600 instructing a fail-safe computer of the vehicle 1600 to assume control, notify the passengers, and complete a safe parking maneuver.

For inferencing, the server(s) 1678 may include the GPU(s) 1684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 17:
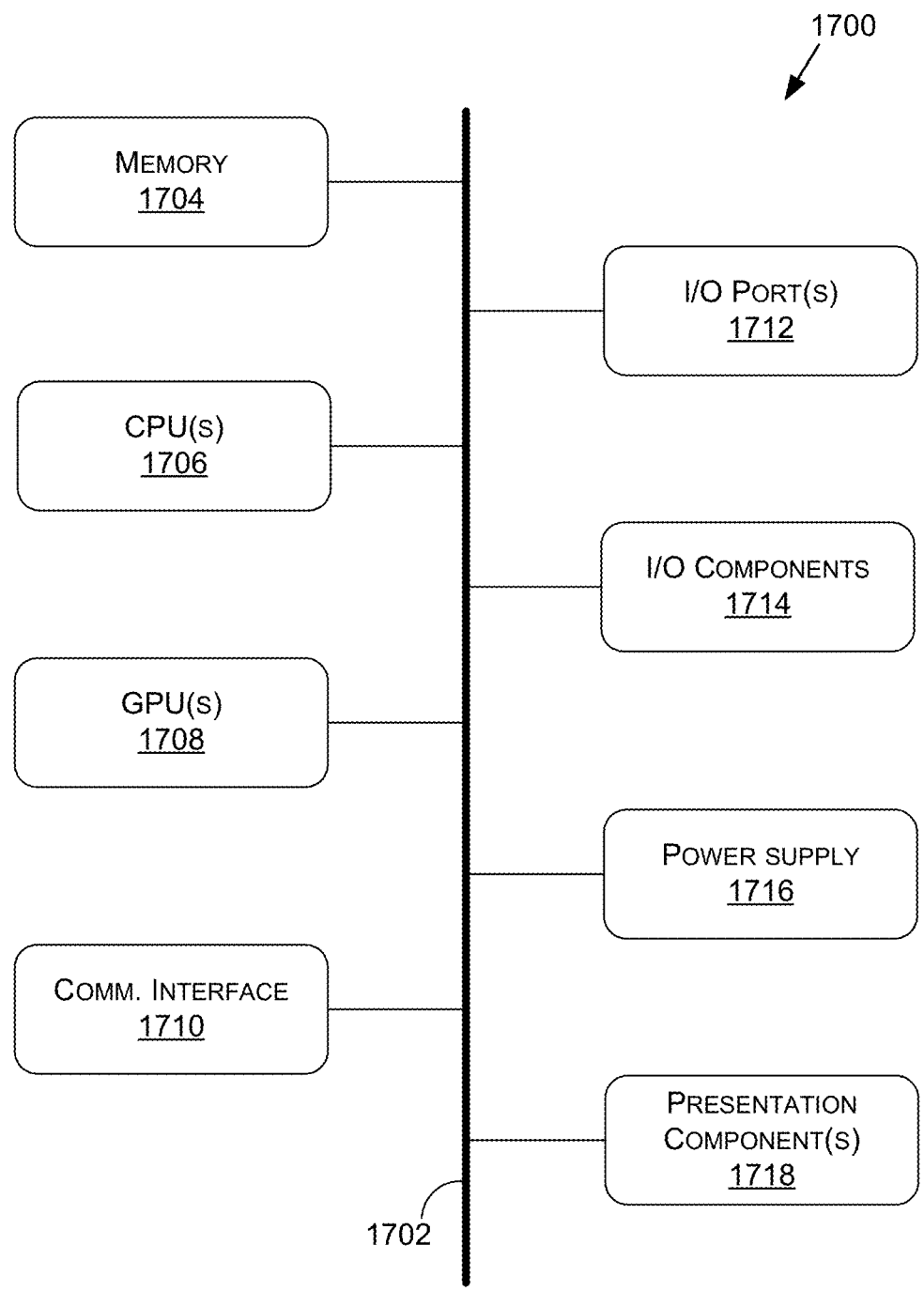
FIG. 17 is a block diagram of an example computing device suitable for use in implementing some embodiments of the present disclosure.

FIG. 17 is a block diagram of an example computing device(s) 1700 suitable for use in implementing some embodiments of the present disclosure. Computing device 1700 may include an interconnect system 1702 that directly or indirectly couples the following devices: memory 1704, one or more central processing units (CPUs) 1706, one or more graphics processing units (GPUs) 1708, a communication interface 1710, input/output (I/O) ports 1712, input/output components 1714, a power supply 1716, one or more presentation components 1718 (e.g., display(s)), and one or more logic units 1720.

Although the various blocks of FIG. 17 are shown as connected via the interconnect system 1702 with lines, this is not intended to be limiting and is for clarity only. For example, in some embodiments, a presentation component 1718, such as a display device, may be considered an I/O component 1714 (e.g., if the display is a touch screen). As another example, the CPUs 1706 and/or GPUs 1708 may include memory (e.g., the memory 1704 may be representative of a storage device in addition to the memory of the GPUs 1708, the CPUs 1706, and/or other components). In other words, the computing device of FIG. 17 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 17.

The interconnect system 1702 may represent one or more links or busses, such as an address bus, a data bus, a control bus, or a combination thereof. The interconnect system 1702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1706 may be directly connected to the memory 1704. Further, the CPU 1706 may be directly connected to the GPU 1708. Where there is direct, or point-to-point connection between components, the interconnect system 1702 may include a PCIe link to carry out the connection. In these examples, a PCI bus need not be included in the computing device 1700.

The memory 1704 may include any of a variety of computer-readable media. The computer-readable media may be any available media that may be accessed by the computing device 1700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1706 may be configured to execute at least some of the computer-readable instructions to control one or more components of the computing device 1700 to perform one or more of the methods and/or processes described herein. The CPU(s) 1706 may each include one or more cores (e.g., one, two, four, eight, twenty-eight, seventy-two, etc.) that are capable of handling a multitude of software threads simultaneously. The CPU(s) 1706 may include any type of processor, and may include different types of processors depending on the type of computing device 1700 implemented (e.g., processors with fewer cores for mobile devices and processors with more cores for servers). For example, depending on the type of computing device 1700, the processor may be an Advanced RISC Machines (ARM) processor implemented using Reduced Instruction Set Computing (RISC) or an x86 processor implemented using Complex Instruction Set Computing (CISC). The computing device 1700 may include one or more CPUs 1706 in addition to one or more microprocessors or supplementary co-processors, such as math co-processors.

In addition to or alternatively from the CPU(s) 1706, the GPU(s) 1708 may be configured to execute at least some of the computer-readable instructions to control one or more components of the computing device 1700 to perform one or more of the methods and/or processes described herein. One or more of the GPU(s) 1708 may be an integrated GPU (e.g., with one or more of the CPU(s) 1706 and/or one or more of the GPU(s) 1708 may be a discrete GPU. In embodiments, one or more of the GPU(s) 1708 may be a coprocessor of one or more of the CPU(s) 1706. The GPU(s) 1708 may be used by the computing device 1700 to render graphics (e.g., 3D graphics) or perform general purpose computations. For example, the GPU(s) 1708 may be used for General-Purpose computing on GPUs (GPGPU). The GPU(s) 1708 may include hundreds or thousands of cores that are capable of handling hundreds or thousands of software threads simultaneously. The GPU(s) 1708 may generate pixel data for output images in response to rendering commands (e.g., rendering commands from the CPU(s) 1706 received via a host interface). The GPU(s) 1708 may include graphics memory, such as display memory, for storing pixel data or any other suitable data, such as GPGPU data. The display memory may be included as part of the memory 1704. The GPU(s) 1708 may include two or more GPUs operating in parallel (e.g., via a link). The link may directly connect the GPUs (e.g., using NVLINK) or may connect the GPUs through a switch (e.g., using NVSwitch). When combined together, each GPU 1708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1706 and/or the GPU(s) 1708, the logic unit(s) 1720 may be configured to execute at least some of the computer-readable instructions to control one or more components of the computing device 1700 to perform one or more of the methods and/or processes described herein. In embodiments, the CPU(s) 1706, the GPU(s) 1708, and/or the logic unit(s) 1720 may discretely or jointly perform any combination of the methods, processes and/or portions thereof. One or more of the logic units 1720 may be part of and/or integrated in one or more of the CPU(s) 1706 and/or the GPU(s) 1708 and/or one or more of the logic units 1720 may be discrete components or otherwise external to the CPU(s) 1706 and/or the GPU(s) 1708. In embodiments, one or more of the logic units 1720 may be a coprocessor of one or more of the CPU(s) 1706 and/or one or more of the GPU(s) 1708.

Examples of the logic unit(s) 1720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1710 may include one or more receivers, transmitters, and/or transceivers that enable the computing device 1700 to communicate with other computing devices via an electronic communication network, included wired and/or wireless communications. The communication interface 1710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1712 may enable the computing device 1700 to be logically coupled to other devices including the I/O components 1714, the presentation component(s) 1718, and/or other components, some of which may be built in to (e.g., integrated in) the computing device 1700. Illustrative I/O components 1714 include a microphone, mouse, keyboard, joystick, game pad, game controller, satellite dish, scanner, printer, wireless device, etc. The I/O components 1714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1700. The computing device 1700 may be include depth cameras, such as stereoscopic camera systems, infrared camera systems, RGB camera systems, touchscreen technology, and combinations of these, for gesture detection and recognition. Additionally, the computing device 1700 may include accelerometers or gyroscopes (e.g., as part of an inertia measurement unit (IMU)) that enable detection of motion. In some examples, the output of the accelerometers or gyroscopes may be used by the computing device 1700 to render immersive augmented reality or virtual reality.

The power supply 1716 may include a hard-wired power supply, a battery power supply, or a combination thereof. The power supply 1716 may provide power to the computing device 1700 to enable the components of the computing device 1700 to operate.

The presentation component(s) 1718 may include a display (e.g., a monitor, a touch screen, a television screen, a heads-up-display (HUD), other display types, or a combination thereof), speakers, and/or other presentation components. The presentation component(s) 1718 may receive data from other components (e.g., the GPU(s) 1708, the CPU(s) 1706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    generating, from sensor data comprising LiDAR data of an environment, a representation of a range image;
    extracting, based at least on the representation of the range image and using one or more Neural Networks (NNs), classification data representing one or more extracted classifications of elements in the environment;

generating labeled geometry data based at least on associating a projected representation of the one or more extracted classifications with corresponding geometry data of the elements;
generating one or more bounding shapes of the elements based at least on the labeled geometry data; and
providing data representing the one or more bounding shapes to a control component of an autonomous vehicle.

2. The method of claim 1, wherein the labeled geometry data comprises one or more first layers representing the projected representation of the one or more extracted classifications, and one or more second layers representing the corresponding geometry data of the elements.

3. The method of claim 1, further comprising generating the range image with a height in pixels corresponding to a number of horizontal scan lines of at least one of one or more LiDAR sensors that captured the LiDAR data.

4. The method of claim 1, wherein the corresponding geometry data of the elements represents one or more slices of the LiDAR data.

5. The method of claim 1, further comprising generating the corresponding geometry data of the elements based at least on sampling one or more height values in one or more slices of the LiDAR data.

6. The method of claim 1, further comprising generating the corresponding geometry data of the elements based at least on unprojecting image data into a three-dimensional representation of the environment.

7. The method of claim 1, further comprising generating the one or more bounding shapes of the elements based at least on applying a representation of the labeled geometry data to the one or more NNs.

8. A processor comprising one or more circuits to:
generate, from LiDAR data obtained using one or more LiDAR sensors of a vehicle in an environment, a representation of a LiDAR range image;
generate, using one or more Neural Networks (NNs), classification data from the representation of the LiDAR range image, the classification data representing one or more per-pixel classifications of objects or scenery depicted in the LiDAR range image;
generate labeled geometry data based at least on associating a projected representation of the one or more per-pixel classifications with corresponding geometry data of the objects or scenery;
determine one or more bounding shapes of the objects or scenery based at least on the labeled geometry data; and
output data representing the one or more bounding shapes to a control component of the vehicle.

9. The processor of claim 8, wherein the labeled geometry data comprises one or more first layers representing the projected representation of the one or more per-pixel classifications, and one or more second layers representing the corresponding geometry data of the objects or scenery.

10. The processor of claim 8, the one or more circuits further to generate the LiDAR range image with a height in pixels corresponding to a number of horizontal scan lines of the one or more LiDAR sensors.

11. The processor of claim 8, wherein the corresponding geometry data of the objects or scenery represents one or more slices of the LiDAR data.

12. The processor of claim 8, the one or more circuits further to generate the corresponding geometry data of the objects or scenery based at least on sampling one or more height values in one or more slices of the LiDAR data.

13. The processor of claim 8, the one or more circuits further to generate the corresponding geometry data of the objects or scenery based at least on unprojecting image data into a three-dimensional representation of the environment.

14. The processor of claim 8, the one or more circuits further to generate the one or more bounding shapes of the objects or scenery based at least on applying a representation of the labeled geometry data to the one or more NNs.

15. A system comprising:
one or more processing units to perform operations comprising:
generating, from LiDAR data of an environment, a representation of a projection image;
generating, based at least on the representation of the projection image and using one or more neural networks (NNs), classification data representing one or more extracted classifications of the environment;
generating labeled height data based at least on associating a projected representation of the one or more extracted classifications with corresponding height data of one or more objects or scenery in the environment; and
generating data representing one or more bounding shapes and class labels of the one or more objects or scenery based at least on the labeled height data.

16. The system of claim 15, wherein the labeled height data comprises one or more first layers representing the projected representation of the one or more extracted classifications, and one or more second layers representing the corresponding height data of the one or more objects or scenery.

17. The system of claim 15, the operations further comprising generating the projection image as a LiDAR range image with a height in pixels corresponding to a number of horizontal scan lines of a LiDAR sensor that captured the LiDAR data.

18. The system of claim 15, wherein the corresponding height data of the one or more objects or scenery represents one or more slices of the LiDAR data.

19. The system of claim 15, the operations further comprising generating the corresponding height data of the one or more objects or scenery based at least on sampling one or more height values in one or more slices of the LiDAR data.

20. The system of claim 15, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

* * * * *